(12) United States Patent
Jang et al.

(10) Patent No.: US 8,711,946 B2
(45) Date of Patent: Apr. 29, 2014

(54) DEVICE AND METHOD FOR UNIFIED CODES

(75) Inventors: Euee-Seon Jang, Seoul (KR); Sun-Young Lee, Seoul (KR); Chung-Ku Lee, Incheon (KR)

(73) Assignee: Humax Co., Ltd., Seongnam-si (KR)

(*) Notice: Subject to any disclaimer, the term of this patent is extended or adjusted under 35 U.S.C. 154(b) by 1303 days.

(21) Appl. No.: 12/242,563

(22) Filed: Sep. 30, 2008

(65) Prior Publication Data

US 2009/0103631 A1  Apr. 23, 2009

Related U.S. Application Data

(63) Continuation of application No. PCT/KR2007/001542, filed on Mar. 29, 2007.

(30) Foreign Application Priority Data

Mar. 31, 2006 (KR) .................. 10-2006-0029937
Jul. 11, 2006 (KR) .................. 10-2006-0065139

(51) Int. Cl.
*H04N 7/12* (2006.01)

(52) U.S. Cl.
USPC .................................................. 375/240.25

(58) Field of Classification Search
USPC .................................................. 375/240.25
See application file for complete search history.

(56) References Cited

U.S. PATENT DOCUMENTS

| | | | |
|---|---|---|---|
| 6,862,320 | B1 | 3/2005 | Isu et al. |
| 2002/0186767 | A1 | 12/2002 | Kawashima et al. |
| 2005/0123057 | A1* | 6/2005 | MacInnis et al. ........ 375/240.25 |
| 2005/0141621 | A1 | 6/2005 | Seo |

* cited by examiner

*Primary Examiner* — Richard Torrente

(74) *Attorney, Agent, or Firm* — Birch, Stewart, Kolasch & Birch, LLP

(57) ABSTRACT

A unified codec device and method are disclosed. A decoding device includes a decoding description decoder, generating at least one table by using inputted decoding description; and a codec unit, decoding and outputting encoded video data, included in an inputted bit-stream, to moving picture data by using the table. With the present invention, a bit-stream, encoded by various formats according to each standard (e.g. MPEG-1, MPEG-2, MPEG-4 and MPEG-4 AVC), can be decoded by the same information recognizing method.

13 Claims, 56 Drawing Sheets

FIG. 17

| Index No. | FU name | # of Input CS/CI | # of output CS/CI | Input data | Output data |
|---|---|---|---|---|---|
| F0 | Parsing FU | 0 | 67 | - | - |
| F1 | DCR | 4 | 0 | QFS | QFSP |
| F2 | IS | 2 | 0 | QFSP | PQF |
| F3 | IAP | 3 | 0 | PQF | QF |
| F4 | IQ | 1 | 0 | QF | F |
| F5 | IT | 0 | 0 | F | f |
| F6 | VR | 0 | 0 | f | D |
| ... | ... | ... | ... | ... | ... |

FIG. 18

| Index | FU | InputCS/CI | # of branches | Branch information |
|---|---|---|---|---|
| R0 | F0(R0) | C63 | 3 | 1: ((C63==1) \|\| (C63==2)) GO R1;<br>2: ((C63==3) \|\| (C63==4)) GO END;<br>3: GO ERR; |
| R1 | PROCESS1<br>(variable setting) | C63 | 2 | 1: (C63==1) GO R2;<br>2: (C63==2) GO R3; |
| R2 | F0(R75) | — | 1 | 1: GO R3; |
| R3 | F0(R85) | — | 1 | 1: GO R4; |
| R4 | F0(R114) | — | 1 | 1: GO R5; |
| R5 | F0(R120) | — | 1 | 1: GO R6; |
| R6 | F1 | — | 1 | 1: GO R7; |
| R7 | F2 | — | 1 | 1: GO R9; |
| R8 | F3 | — | 1 | 1: GO R10; |
| R9 | F4 | — | 1 | 1: GO R11; |
| R10 | F5 | — | 1 | 1: GO R12; |
| R11 | F6 | C65<br>C66<br>C67 | 3 | 1: (C66<=6) GO R5;<br>2: (C65<=C67) GO R4;<br>3: GO R12; |
| R12 | F0(R74) | C63 | 4 | 1: (C63==1) GO R2;<br>2: (C63==2) GO R3;<br>3: ((C63==3) \|\| (C63==4)) GO END;<br>4: GO ERR; |

FIG. 19

| Index No. | CSCI information | CSCI |
|---|---|---|
| F1-C1 | Quantiser_scale | C54 |
| F1-C2 | CBP | C56 |
| F1-C3 | Ac_pred_flag | C58 |
| F1-C4 | The number of MB | C65 |
| F2-C1 | CBP | C56 |
| F2-C2 | Ac_pred_flag | C58 |
| F3-C1 | Quantiser_scale | C54 |
| F3-C2 | Ac_pred_flag | C58 |
| F3-C3 | The number of MB | C65 |
| F4-C1 | Quantiser_scale | C54 |
| ... | ... | ... |

FIG. 20

| Index | Flag | Element Name | Length/Type | Global/Local | Note |
|---|---|---|---|---|---|
| C0 | 1bit | Decoding OK | 1 bit | Local | Boolean. To acknowledge whether the decoding process is clearly processing or not. |
| C1 | 1bit | Profile and level indication | 8 bit | Global | |
| C2 | 1bit | User data | 8 bit array | Global | An array of arbitrary length of user data. |
| C3 | 1bit | Visual object verID | 4 bit | Global | |
| ... | ... | ... | ... | ... | ... |
| C53 | 1bit | Alternate vertical scan flag | 1 bit | Global | |
| C54 | 1bit | VOP quant | 9 bit | Global | VLD: define CSCI storage for maximum length (9). |
| C55 | 1bit | Macro-block type | 3 bit | Global | |
| C56 | 1bit | Coded block pattern for Chroma | 1 bit array(2) | Global | |
| C57 | 1bit | D-quant | 2 bit | Global | |
| C58 | 1bit | AC prediction flag | 1 bit | Global | |
| ... | ... | ... | ... | ... | ... |
| C62 | 1bit | DCT Coefficients | 8 bit array(6)(64) | Global | |
| C63 | 1bit | GOP or VOP branch condition | 3 bit | Global | |
| C64 | 1bit | #frame | 32 bit | Global | |
| C65 | 1bit | #MB | 32 bit | Global | |
| C66 | 1bit | #Block | 8 bit | Global | |
| C67 | 1bit | #Total MB | 32 bit | Global | |

FIG. 21

| Index | Element Name | Input | Output | Process by SET-PROC | Note |
|---|---|---|---|---|---|
| M | Marker Bit | 1 bit | C0 | READ 1 > C0; | |
| S0 | Visual object sequence start code | 32 bit | C0 | READ 32 B;<br>(C0=(IBS==HEX:1B0)); | |
| S1 | Profile and level indication | 8 bit | C1 | READ 8 > C1; | |
| S2 | Visual object sequence end code | 32 bit | C0 | READ 32 B;<br>(C0=((IBS==HEX:1B1) \|\| (EOF))); | |
| S3 | Is user data or not | 32 bit | [C2] | SEEK 32 B;<br>IF(IBS==HEX:1B2){SET C2;} | Seek next bits and branch before physically read a start code. |
| S4 | User data start code | 32 bit | C0 | READ 32 B;<br>(C0=(IBS==HEX:1B2); | |
| S5 | User data | 8 bit (Array) | C2 | SEEK 24;<br>WHILE (IBS != 1) {READ 8;PUSH C2 IBS;SEEK 24;} | |
| S6 | Visual object start code | 32 bit | C0<br>[C3]<br>[C4] | READ 32 B;<br>(C0=(IBS==HEX:1B5));<br>SET C3, C4; | Default some values. |
| S7 | Is visual object identifier | 1 bit | [C13]<br>[C14] | READ 1;<br>if(IBS==1){SET C13, C14;} | |

FIG. 22

| | | | | |
|---|---|---|---|---|
| S8 | Visual object verID | 4 bit | [C6] | READ 4 > C3; |
| S9 | Visual object priority | 3 bit | C4 | READ 3 > C4; |
| S10 | Visual object type | 4 bit | C5 | READ 4 > C5; |
| S11 | Video object start code | 32 bit | C0 | READ 32 B; (C0=(IBS in HEX:100~HEX:11F)); |
| S12 | Video signal type | 1 bit | [C6] [C7] | READ 1; If(IBS==1){SET C6, C7;} | Default some values. |
| S13 | Video format | 3 bit | C6 | READ 3 > C6; |
| ... | ... | ... | ... | ... | ... |
| S32 | Video object layer shape | 2 bit | C20 | READ 2 > C20; |
| S33 | VOP time increment resolution | 16 bit | C21 00 | READ 16 > C21; (C0=(C21!=0)); | 0 is forbidden. |
| S34 | Fixed VOP rate | 1 bit | C22 | READ 1 > C22; |
| S35 | Fixed VOP time increment | 1~16bit | C23 | READ BITSIZE:C21 > C23; | Length can varied by value of VOP time increment resolution. |
| S36 | Video object layer width | 13 bit | C24 00 | READ 13 > C24; (C0=(C24!=0)); | 0 is forbidden. |
| S37 | Video object layer height | 13 bit | C25 00 | READ 13 > C25; (C0=(C25!=0)); | 0 is forbidden. |

FIG. 23

| | | | | |
|---|---|---|---|---|
| S38 | Interlaced | 1 bit | C26 | READ 1 > C26; | |
| S39 | OBMC disable | 1 bit | C27 | READ 1 > C27; | |
| S40 | Sprite enable | 1/2 bit | C28 | IF (C13==1) { READ 1 > C28; } ELSE { READ 2 > C28; } | |
| ... | ... | ... | ... | ... | ... |
| S55 | Reduced resolution VOP enable | 1 bit | C39 | READ 1 > C39; | |
| S56 | Scalability | 1 bit | C40 | (C40=0); | Do not read this syntax. (A difference between VCTR ref SW and ISO 14496-2) Original code of this syntax:READ 1 > C40; |
| S57 | GOP or VOP appears | 32 bit | C63 | SEEK 24 B; IF (IBS!=1) { READ 8 B;IF (EOF) { (C63=4); STOP; }}SEEK 32 B; IF (IBS==HEX:1B3) { (C63=1); } ELSE IF (IBS==HEX:1B6) { (C63=2); } { (C63=3); }ELSE { (C63=0); } | |
| S58 | Group of VOP start code | 32 bit | C0 | READ 32 B; (C0=(IBS==HEX:1B3)); | |
| S59 | Time code (Hours) | 5 bit | C41 | READ 5 > C41 | Time code element |
| S60 | Time code (Minutes) | 6 bit | C42 | READ 6 > C42; | Time code element |
| S61 | Time code (Seconds) | 6 bit | C43 | READ 6 > C43; | Time code element |

FIG. 24

| | | | | |
|---|---|---|---|---|
| S82 | Closed GOV | 1 bit | C44 | READ 1 > C44; |
| ... | ... | ... | ... | ... |
| S75 | D-quant | 2 bit | C57 | READ 2 > C57; |
| S76 | AC prediction flag | 1 bit | C58 | READ 1 > C58; |
| S77 | CBPY | 1-6 bit | C59 | VLD [1]:(C59[0]=DIGIT:IBS_1);<br>(C59[1]=DIGIT:IBS_2);<br>(C59[2]=DIGIT:IBS_3);<br>(C59[3]=DIGIT:IBS_4); |
| S78 | DCT DC size luminance | 2-11 bit | C60 | VLD [2] > C60[C66]; |
| ... | ... | ... | ... | ... |
| S91 | DCT Coefficients | 19 bit | C62 | IF (C66<4) {(V7 = (3 - C66));<br>(V1=[DIGIT:C59_V7]);}<br>ELSE {(V7 = (5 -C66));<br>(V1=[DIGIT:C56_V7]);}<br>IF (V1 != 0) {(V5 = 0);<br>UNTIL (V5 = 0) {VLD [4] > V2;<br>RLD V2,V3,V4,V5,T4;(V6 = 1);<br>WHILE (V6 < V4) {(C62[C66][V6] = 0);<br>(V6++);}(C62[C66][V6] = V3);(V6++);}<br>WHILE (V6 < 64) {(C62[C66][V6] = 0);(V6++);}} |

FIG. 25

| Index | Syntax | Input | No. of Branches | Branch Information | Note |
|---|---|---|---|---|---|
| ERR | - | - | - | None. | An FSM state that identifies a fatal error occurred during decoding process. |
| R0 | S0 | C0 | 2 | 1: (C0==1) GO R1;<br>2: GO ERR; | VS start code |
| R1 | S1 | - | 1 | 1: GO R2; | |
| R2 | S3 | [C2] | 2 | 1: ([C2]==1) GO R3;<br>2: GO R5; | User data or not |
| R3 | S4 | - | 1 | 1: GO R4; | User data start code |
| R4 | S5 | - | 1 | 1: GO R5; | User data |
| R5 | S6 | C0 | 2 | 1: (C0==1) GO R6;<br>2: GO ERR; | VO start code |
| R6 | S7 | [C13]<br>[C14] | 2 | 1: ([C13]==1 && [C14]==1) R7;<br>2: GO R8; | Branch : VO identifier |
| R7 | S8 | - | 1 | 1: GO R8; | |
| R8 | S9 | - | 1 | 1: GO R8; | |
| R9 | S10 | C5 | 2 | 1: ((C5==1) \|\| (C5==2)) GO R10;<br>2: GO R17; | Branch : Video signal type parameters by VO type |
| R10 | S12 | [C6]<br>[C7] | 2 | 1: ([C6]==1 && [C7]==1) GO R11;<br>2: GO R17; | Branch : Video signal type → |
| ... | ... | ... | ... | ... | ... |

FIG. 26

| | | | | | |
|---|---|---|---|---|---|
| R20 | S11 | C0 | 2 | 1: (C0==1) GO R21;<br>2: GO ERR; | Video object start code |
| R21 | S19 | C0 | 2 | 1: (C0==1) GO R22;<br>2: GO ERR; | Video object layer start code |
| R22 | S20 | - | 1 | 1: GO R23; | |
| R23 | S21 | C12 | 2 | 1: (C12==BIN:00010010) GO ERR;<br>2: GO R24; | VO type indication=Fine Granularity Scalable →<br>Do not process this branch now yet. (SP/ASP) |
| R24 | S22 | [C13]<br>[C14]<br>[C15] | 2 | 1: ([C13]==1 && [C14]==1<br>&& [C15]==1) GO R25;<br>2: GO R27; | Branch : VOL identifiers → |
| R25 | S23 | - | 1 | 1: GO R26; | |
| R26 | S24 | - | 1 | 1: GO R27; | |
| R27 | S25 | C15 | 2 | 1: (C15==BIN:1111) GO R28;<br>2: GO R30; | Branch : Extended-PAR parameters → |
| R28 | S26 | C0 | 1 | 1: (C0==1) GO R29;<br>2: GO ERR; | Forbidden value check |
| R29 | S27 | C0 | 1 | 1: (C0==1) (C67=(C24*C25/256));<br>GO R30;<br>2: GO ERR; | Forbidden value check |
| R30 | S28 | [C18]<br>[C19] | 2 | 1: ([C18]==1 && [C19]==1) GO R31;<br>2: GO R34; | Branch : VOL control parameters → |
| R31 | S29 | - | 1 | 1: GO R32; | |
| R32 | S30 | - | 1 | 1: GO R33; | |

FIG. 27

| | | | | |
|---|---|---|---|---|
| R33 | S31 | [C20] | 2 | 1: ([C20]=1) GO R34;<br>2: GO ERR; | VBV parameters →<br>Do not process this branch now yet. (SP/ASP) |
| R34 | S32 | C20<br>C12 | 2 | 1: ((C20=3) && (C12!=1)) GO ERR;<br>2: GO R35; | Video object layer shape extension →<br>Do not process this branch now yet. (SP/ASP) |
| R35 | M | C0 | 2 | 1: (C0==1) GO R36;<br>2: GO ERR; | Marker bit |
| ... | ... | ... | ... | ... | ... |
| R49 | S40 | C28 | 2 | 1: ((C28=1) \|\| (C28=2)) GO ERR;<br>2: GO R50; | Sprite enable: Length variation branch is controlled in SET. Sprite enabled (static, GMC) syntax<br>→ Do not process this branch now yet. (SP/ASP) |
| R50 | - | C13<br>C20 | 2 | 1: ((C13!=1) && (C20!=0)) GO R51;<br>2: GO ERR; | SADCT disable →<br>Do not process this branch now yet. (SP/ASP) |
| R51 | S41 | - | 1 | 1: GO R52; | |
| R52 | S42 | C30 | 2 | 1: (C30==1) GO R53;<br>2: GO R59; | Branch : Matrix loadings → |
| R53 | S43 | [C31] | 2 | 1: ([C31]=1) GO R54;<br>2: GO R55; | Branch : Load intra matrix or not → |
| R54 | S44 | C0 | 2 | 1: (C0==1) GO R55;<br>2: GO ERR; | |
| ... | ... | ... | ... | ... | ... |
| R65 | - | C13 | 2 | 1: (C13!=1) GO R66;<br>2: GO R68; | Branch : New-prediction → |

FIG. 28

| R66 | S54 | C38 | 2 | 1: (C38==1) GO ERR;<br>2: GO R67; | New-prediction parameters →<br>Do not process this branch now yet. (SP/ASP) |
| --- | --- | --- | --- | --- | --- |
| R67 | S55 | – | 1 | 1: GO R68; | |
| R68 | S56 | C40 | 2 | 1: (C40==1) GO ERR;<br>2: GO R69; | Scalability parameters →<br>Do not process this branch now yet. (SP/ASP) |
| R69 | S3 | [C2] | 2 | 1: ([C2]==1) GO R70;<br>2: GO R72; | User data or not |
| R70 | S4 | – | 1 | 1: GO R71; | User data start code |
| R71 | S5 | – | 1 | 1: GO R72; | User data |
| R72 | S57 | – | 1 | 1: GO RT; | Branch : GOP or VOP → |
| R73 | S58 | C0 | 2 | 1: (C0==1) GO R74;<br>2: GO ERR; | Group of VOP start code |
| R74 | S59 | – | 1 | 1: GO R75; | |
| ... | ... | ... | ... | ... | ... |

FIG. 29

| name | value | code |
|---|---|---|
| MCBPC | 0 | 1 |
| MCBPC | 1 | 001 |
| MCBPC | 2 | 010 |
| ... | ... | ... |
| MCBPC | 8 | 000000001 |
| MCBPC | 9 | NULL |
| CBPY | 0 | 0011 |
| CBPY | 1 | 00101 |
| CBPY | 2 | 00100 |
| ... | ... | ... |
| CBPY | 17 | 000001 |
| CBPY | 18 | NULL |
| intraDCy | 0 | 011 |
| intraDCy | 1 | 11 |
| intraDCy | 2 | 10 |

FIG. 30

| intraDCy | 3 | 010 |
|---|---|---|
| ... | ... | ... |
| intraDCy | 12 | 00000000001 |
| intraDCy | 13 | NULL |
| intraDCc | 0 | 11 |
| intraDCc | 1 | 10 |
| intraDCc | 2 | 01 |
| ... | ... | ... |
| intraDCc | 12 | 000000000001 |
| intraDCc | 13 | NULL |
| DCT intra | 0 | 10 |
| DCT intra | 1 | 1111 |
| ... | ... | ... |
| DCT intra | 101 | 000001011111 |
| DCT intra | 102 | 0000011 |
| DCT intra | 103 | NULL |

FIG. 31

| Command | Usage | Example |
|---|---|---|
| READ | READ bits B > CSCI; | READ 32 B > C0;<br>READ 8;<br>READ 1 > C12; |
| SEEK | SEEK bits B > CSCI; | SEEK 32 B > C0; |
| FLUSH | FLUSH bits B; | FLUSH 8; |
| IF | IF (condition) { ~ }<br>ELSE { ~ } | |
| WHILE | WHILE (condition) { ~ } | |
| UNTIL | UNTIL (condition) { ~ } | |
| DO-WHILE | DO { ~ } WHILE (condition) | |
| DO-UNTIL | DO { ~ } UNTIL (condition) | |
| ( ~ ) (compute) | ( ………… ) | (C11=(V2+3)); |
| BREAK | BREAK; | |
| SET | SET CSCI, CSCI…; | SET C0, C2; |
| STOP | STOP; | |
| PUSH | PUSH CSCI Value, Value…; | PUSH C8 8, 16, 32; |
| GO | GO R#;; | GO R23; |
| HEX | HEX:value; | HEX:0F; |
| RLD | RLD index, level, run, islastrun, t#; | RLD V1, V2, V3, V4, T4; |
| VLD2 | VLD2 [T#] in > v1, v2, v3; | VLD2 [0] IBS > V1, V2, V3; |
| VLD4 | VLD4 [T#] > CSCI; | VLD4 [0] > C56; |

FIG. 32

| Index | Element Name | Input | Output | Process by SET-PROC | Note |
|---|---|---|---|---|---|
| M | Marker_Bit | 1 bit | C0 | READ 1 > C0; | |
| S0 | start_code | 32 bit | C0 | READ 32 B:<br>IF ((IBS== HEX:000001B3) C72=1;<br>IF ((IBS== HEX:000001B8) C72=2;<br>IF ((IBS== HEX:00000100) C72=3;<br>IF ((IBS== HEX:000001B7) C72=4; | sequence_header_code<br>group_start_code<br>picture_start_code<br>sequence_end_code |
| S1 | horizontal_size_value | 12 bit | C1<br>[C1] | READ 12 > C1;<br>SET C1; | |
| S2 | vertical_size_value | 12 bit | C2<br>[C2] | READ 12 > C2;<br>SET C2; | |
| S3 | aspect_ratio_information | 4 bit | C3 | READ 4 > C3; | |
| S4 | frame_rate_code | 4 bit | C4<br>[C4] | READ 4 > C4;<br>SET C4; | |
| S5 | bit_rate_value | 18 bit | C5<br>[C5] | READ 18 > C5;<br>SET C5; | |
| S6 | vbv_buffer_size_value | 10 bit | C6<br>[C6] | READ 10 > C6;<br>SET C6; | |
| S7 | constrained_parameters_flag | 1 bit | C7 | READ 1 > C7; | |
| S8 | load_intra_quantiser_matrix | 1 bit | [C8] | READ 1;IF(IBS==1) {SET C8;} | |
| S9 | Intra quantiser matrix | 8 bit<br>(Array) | C8 | (V1=0);DO {READ 8;PUSH C8<br>IBS; (V1++);} UNTIL (V1==64); | |

FIG. 33

| | | | |
|---|---|---|---|
| S10 | Default_intra_quantiser_matrix | 8 bit (Array) | 08 | PUSH C8 08, 16, 19, 22, 26, 27, 29, 34;<br>PUSH C8 16, 16, 22, 24, 27, 29, 34, 37;<br>PUSH C8 19, 22, 26, 27, 29, 34, 34, 38;<br>PUSH C8 22, 22, 26, 27, 29, 34, 37, 40;<br>PUSH C8 22, 26, 27, 29, 32, 35, 40, 48;<br>PUSH C8 26, 27, 29, 32, 35, 40, 48, 58;<br>PUSH C8 26, 27, 29, 34, 38, 46, 56, 69;<br>PUSH C8 27, 29, 35, 38, 46, 56, 69, 83; |
| S11 | load_non_intra_quantiser_matrix | 1 bit | [C9] | READ 1;IF(IBS==1) {SET C9;} |
| S12 | non_intra_quantiser_matrix | 8 bit (Array) | C9 | (V1=0);DO {READ 8;PUSH C9 IBS;(V1++);} UNTIL (V1==64); |
| S13 | Default_non_intra_quantiser_matrix | 8 bit (Array) | C9 | PUSH C9 16, 16, 16, 16, 16, 16, 16, 16;<br>PUSH C9 16, 16, 16, 16, 16, 16, 16, 16;<br>PUSH C9 16, 16, 16, 16, 16, 16, 16, 16;<br>PUSH C9 16, 16, 16, 16, 16, 16, 16, 16;<br>PUSH C9 16, 16, 16, 16, 16, 16, 16, 16;<br>PUSH C9 16, 16, 16, 16, 16, 16, 16, 16;<br>PUSH C9 16, 16, 16, 16, 16, 16, 16, 16;<br>PUSH C9 16, 16, 16, 16, 16, 16, 16, 16; |
| S14 | chroma_intra_quantizer_matrix | 8 bit (Array) | C10 | (V1=0);DO {PUSH C10 C8;(V1++);} UNTIL (V1==64); |
| S15 | chroma_non_intra_quantizer_matrix | 8 bit (Array) | C11 | (V1=0);DO {PUSH C11 C9;(V1++);} UNTIL (V1==64); |
| S16 | extension_start_code | 32 bit | C0 | READ 32 B;(C0==(IBS==HEX:000001B5)); |
| S17 | extension_start_code_identifier | 4 bit | C12 | READ 4 > C12; |

FIG. 34

| | | | | |
|---|---|---|---|---|
| S18 | profile_and_level_indication | 8 bit | C13<br>C24<br>C25 | READ 8 > C13;<br>C24 = C13 >> 4;<br>C25 = C13 & HEX:F; |
| S19 | progressive_sequence | 1 bit | C14 | READ 1 > C14; |
| S20 | chroma_format | 2 bit | C15 | READ 1 > C15; |
| S21 | horizontal_size_extension | 2 bit | C16<br>C1 | READ 2 > C16;IF ([C1]==1)<br>{C1\|= (C16<<12) \| (C1 & HEX:0fff);} |
| S22 | vertical_size_extension | 2 bit | C17<br>C2 | READ 2 > C17;IF ([C2]==1)<br>{C2\|= (C17<<12) \| (C2 & HEX:0fff);} |
| S23 | bit_rate_extension | 12 bit | C18<br>C5<br>C26 | READ 12 > C18;<br>IF ([C5]==1) { C5 += (C18<<18);}<br>C26 = ((double) C5) * 400.0; |
| S24 | vbv_buffer_size_extension | 8 bit | C19<br>C6 | READ 8 > C19;IF ([C6]==1)<br>{C6+= (C19 << 10);} |
| S25 | low_delay | 1 bit | C20 | READ 1 > C20; |
| S26 | frame_rate_extension_n | 2 bit | C21<br>[C21] | READ 2 > C21;<br>SET C21; |
| S27 | frame_rate_extension_d | 5 bit | C22<br>[C22] | READ 5 > C22;<br>SET C22; |
| S28 | | | C23 | IF((([C4]==1)&&([C21]==1)&&([C22]==1))<br>{FRATE C4 > V1;}<br>C23 = V1*((C21+1)/(C22+1));} |

FIG. 35

| | | | |
|---|---|---|---|
| S29 | video_format | 3 bit | C27 | READ 3 > C27; |
| S30 | color_description | 1 bit | [C28] [C29] [C30] | READ 1; IF (IBS==1) {SET C28;SET C29;SET C30;} |
| S31 | color_primaries | 8 bit | C28 | READ 8 > C28; |
| S32 | transfer_characteristics | 8 bit | C29 | READ 8 > C29; |
| S33 | matrix_coefficients | 8 bit | C30 | READ 8 > C30; |
| S34 | display_horizontal_size | 14 bit | C31 | READ 14 > C31; |
| S35 | display_vertical_size | 14 bit | C32 | READ 14 > C32; |
| S36 | drop_flag | 1 | C33 | READ 1 > C33; |
| S37 | hour | 5 | C34 | READ 5 > C34; |
| S38 | minute | 6 | C35 | READ 6 > C35; |
| S39 | sec | 6 bit | C36 | READ 6 > C36; |
| S40 | frame | 6 bit | C37 | READ 6 > C37; |
| S41 | closed_gop | 1 bit | C38 | READ 1 > C38; |
| S42 | broken_link | 1 bit | C39 | READ 1 > C39; |
| S43 | temporal_reference | 10 bit | C40 | READ 10 > C40; |
| S44 | picture_coding_type | 3 bit | C41 | READ 3 > C41; |
| S45 | vbv_delay | 16bit | C42 | READ 16 > C42; |

FIG. 36

| | | | | |
|---|---|---|---|---|
| S46 | | 4bit (Array) | C43 | (V1=0); DO { READ 4;PUSH C43 IBS; (V1++);}UNTIL (V1==4); |
| S47 | f_code | | | |
| S47 | intra_dc_precision | 2 bit | C44 | READ 2 > C44; |
| S48 | picture_structure | 2 bit | C45 | READ 2 > C45; |
| S49 | top_field_first | 1 bit | C46 | READ 1 > C46; |
| S50 | frame_pred_frame_dct | 1 bit | C47 | READ 1 > C47; |
| S51 | concealment_motion_vectors | 1 bit | C48 | READ 1 > C48; |
| S52 | q_scale_type | 1 bit | C49 | READ 1 > C49; |
| S53 | intra_vlc_format | 1 bit | C50 | READ 1 > C50; |
| S54 | alternate_scan | 1 bit | C51 | READ 1 > C51; |
| S55 | repeat_fist_field | 1 bit | C52 | READ 1 > C52; |
| S56 | chroma_420_type | 1 bit | C53 | READ 1 > C53; |
| S57 | progressive_frame | 1 bit | C54 | READ 1 > C54; |
| S58 | composite_display_flag | 1 bit | C55 | READ 1 > C55; |
| S59 | slice_start_code and slice_vertical_position, | 32 bit | C0 C56 | SEEK 32 B;IF(((IBS< HEX:101) \|\|(IBS>HEX:1AF)){C0=0;}ELSE {C0=1;FLUSH 32 B;C56=IBS&HEX:FF;} |
| S60 | slice_vertical_ position_extension | 3 bit | C57 | IF (C2>2800) {READ 3 > C57;}ELSE { C57=0;} |
| S61 | quantiser_scale_code andquantiser_scale | 5 bit | C58 C59 | READ 5 > C58; IF (C49==1) {C59 = C58 ;}ELSE {C59=C58<<1 ;} |

FIG. 37

| | | | | |
|---|---|---|---|---|
| S62 | slice_extension_flag | 1 bit | C60 | READ 1;IF (!BS==0) {C60=0;} |
| S63 | macroblock_address_increment | 1-11 bits | C62 | V1=0;SEEK 11; IF(IBS >=1024) {FLUSH 1; C62=V1+1;} |
| S64 | | 23 bits | C0 | SEEK 23;IF (!IBS) {C0=0;}ELSE {C0=1;} |
| S65 | macroblock_type | 1-2 bit | C64 | READ 1;IF (!IBS==1) {C64=1;}ELSE {READ 1; IF (IBS==1) { C64=17;}} |
| S66 | dct_type | 0-1 bit | C65 | IF ((C45==3)&&(!C47)&&(C64&3) {READ 1 > C55;}ELSE {C65=0;} |
| S67 | coded_block_pattern | | C66 | IF(C64 & 1) { C66=(1<<6)-1}ELSE {C66=0;} |
| S68 | | | C0 | C0=0; IF(C66 & (1<<(5-C67)))) {IF (C64&1) { C0=1;}} |
| S69 | DCT DC size luminance | 5-14 bit | C68 | SEEK 5;IF (!BS<31) {VLD2 [0] IBS> V1, V2, V3; C68 = V1;FLUSH V2;}ELSE {SEEK 9; (IBS=(BS-HEX:1f0));VLD2 [1] IBS> V1, V2, V3;C68 = V1;FLUSH V2;} |
| S70 | DCT DC size chrominance | 5-15 bit | C68 | SEEK 5;IF (!BS<31) {VLD2 [2] IBS> V1, V2, V3;C68 = V1; FLUSH V2;}ELSE {SEEK 10; IBS=IBS-HEX:3e0;VLD2 [3] IBS> V1, V2, V3;C68 = V1;FLUSH V2;} |
| S71 | DCT DC differential | 3-9bit | C69 C70[C67] | IF (C68==0) {C69 = 0;} ELSE {READ C68 > C69; IF ((C69 & (1<<(C68-1)))==0) {C69 -= (1<<(C68)) - 1;} C70[C67][0]=C69; |

| | | | | |
|---|---|---|---|---|
| | | | | |
| | | | | |
| | | | | Only for I-picture (not P and B) |
| | | | | |
| | | | | |
| | | | | |
| | | | | |
| | | | | |
| | | | | |
| | | | | |

FIG. 38

| S72 | 1~9 bit | C70 |  |
|---|---|---|---|
| DCT Coefficients |  | C0 | C0=1; V7=1; V8=1;<br>WHILE (V8<64) {C70[C67][V8] = 0;V8++;}<br>WHILE (1) {SEEK 16;<br>IF (IBS>=16384 && !(C50)) {V9=4;V10=(IBS>>12)-4;}<br>ELSE IF (IBS>=1024) {IF (C50) {V9=5;<br>V10=(IBS>>8)-4;}<br>ELSE {V9=6;V10=(IBS>>8)-4;}}<br>ELSE IF (IBS>=512) {IF (C50) {V9=7;<br>V10=(IBS>>6)-8;}<br>ELSE {V9=8;V10=(IBS>>6)-8;}}<br>ELSE IF (IBS>=256) {V9=9;V10=(IBS>>4)-16;}<br>ELSE IF (IBS>=128) {V9=10;V10=(IBS>>3)-16;}<br>ELSE IF (IBS>=64) {V9=11;V10=(IBS>>2)-16;}<br>ELSE IF (IBS>=32) {V9=12;V10=(IBS>>1)-16;}<br>ELSE IF (IBS>=16) {V9=13;V10=(IBS-16);}<br>ELSE {C0=0;STOP;}<br>VLD2 [V9] V10 >V1, V2, V3;<br>FLUSH V3;;<br>IF (V1==64) {STOP;}<br>IF (V1==65) {READ 6 > V4;<br>V7 += V4;<br>READ 12> V5;<br>IF ((V5&2047)==0) {C0=0;STOP;}<br>IF((V6 = (V5>2048))) { V5 = 4096 -V5;}}<br>ELSE {V4=V1; V7 += V4;V5=V2; READ 1 > V5;}<br>IF (V7>64) {C0=0;STOP;}<br>IF (V6) {V5= -V5;}C70[C67][V7] = V5;} |

FIG. 39

| Index | Syntax | Input | No. of Branches | Branch information | Note |
|---|---|---|---|---|---|
| ERR | - | - | - | | |
| R0 | S0 | C72 | 4 | 1: (C72==1) GO R1;<br>2: (C72==2) GO R39;<br>3: (C72==3) GO R47;<br>4: (C72==4) GO RT; | sequence_header_code<br>group_start_code<br>picture_start_code<br>sequence_end_code |
| R1 | S1 | - | 1 | 1: GO R2; | horizontal_size_value |
| R2 | S2 | - | 1 | 1: GO R3; | horizontal_size_value |
| R3 | S3 | - | 1 | 1: GO R4; | aspect_ratio_information |
| R4 | S4 | - | 1 | 1: GO R5; | frame_rate_code |
| R5 | S5 | - | 1 | 1: GO R6; | Bit_rate_value |
| R6 | M | - | | | |
| R7 | S6 | - | 1 | 1: GO R8; | vbv_buffer_size_value |
| R8 | S7 | - | 1 | 1: GO R9; | constrained_parameters_flag |
| R9 | S8 | [C8] | 2 | 1: ([C8]==1) GO R10;<br>2: GO R11; | load_intra_quantiser_matrix |
| R10 | S9 | - | 1 | 1: GO R12; | Intra quantiser matrix |
| R11 | S10 | - | 1 | 1: GO R12; | Default intra quantiser matrix |
| R12 | S11 | [C9] | 2 | 1: ([C9]==1) GO R13;<br>2: GO R14; | load_non_intra_quantiser_matrix |
| R13 | S12 | - | 1 | 1: GO R15; | non_Intra quantiser matrix |

FIG. 40

| | | | | |
|---|---|---|---|---|
| R14 | S13 | – | 1 | 1: GO R15; | Default non_intra_quantiser matrix |
| R15 | S14 | – | 1 | 1: GO R16; | chroma_intra_quantizer_matrix |
| R16 | S15 | – | 1 | 1: GO RT; | chroma_non_intra_quantizer_matrix |
| R17 | S16 | C0 | 2 | 1: (C0==1) GO R18;<br>2: GO ERR; | extension_start_code |
| R18 | S17 | C12 | 4 | 1: (C12==1) GO R19;<br>2: (C12==2) GO R31;<br>3: (C12==8) GO R50;<br>4: GO ERR; | extension_start_code_identifier |
| R19 | S18 | – | 1 | 1: GO R20; | profile_and_level_indication |
| R20 | S19 | – | 1 | 1: GO R21; | progressive_sequence |
| R21 | S20 | – | 1 | 1: GO R22; | progressive_sequence |
| R22 | S21 | – | 1 | 1: GO R23; | chroma_format |
| R23 | S22 | – | 1 | 1: GO R24; | horizontal_size_extension |
| R24 | S23 | – | 1 | 1: GO R25; | vertical_size_extension |
| R25 | M | – | 1 | 1: GO R26; | bit_rate_extension |
| R26 | S24 | – | 1 | 1: GO R27; | vbv_buffer_size_extension |
| R27 | S25 | – | 1 | 1: GO R28; | low_delay |
| R28 | S26 | – | 1 | 1: GO R29; | frame_rate_extension_n |
| R29 | S27 | – | 1 | 1: GO R30; | frame_rate_extension_d |
| R30 | S28 | – | 1 | 1: GO RT; | |

FIG. 41

| | | | |
|---|---|---|---|
| R31 | S29 | — | 1 | 1: GO R32; | video_format |
| R32 | S30 | [C28] | 2 | 1: ([C28]==1) GO R33; 2: GO R36; | color_description |
| R33 | S31 | — | 1 | 1: GO R34; | color_primaries |
| R34 | S32 | — | 1 | 1: GO R35; | transfer_characteristics |
| R35 | S33 | — | 1 | 1: GO R36; | matrix_coefficients |
| R36 | S34 | — | 1 | 1: GO R37; | display_horizontal_size |
| R37 | M | — | 1 | 1: GO RT; | display_vertical_size |
| R38 | S35 | — | 1 | 1: GO R40; | drop_flag |
| R39 | S36 | — | 1 | 1: GO R41; | hour |
| R40 | S37 | — | 1 | 1: GO R42; | minute |
| R41 | S38 | — | 1 | 1: GO R43; | |
| R42 | M | — | 1 | 1: GO R44; | sec |
| R43 | S39 | — | 1 | 1: GO R45; | frame |
| R44 | S40 | — | 1 | 1: GO R46; | closed_gop |
| R45 | S41 | — | 1 | 1: GO RT; | broken_link |
| R46 | S42 | — | 1 | 1: GO R48; | temporal_reference |
| R47 | S43 | — | 1 | 1: GO R49; | picture_coding_type |
| R48 | S44 | — | 1 | 1: GO RT; | vbv_delay |
| R49 | S45 | — | 1 | | |

FIG. 42

| | | | | |
|---|---|---|---|---|
| R50 | S46 | – | 1 | 1: GO R51; | f_code |
| R51 | S47 | – | 1 | 1: GO R52; | intra_dc_precision |
| R52 | S48 | – | 1 | 1: GO R53; | picture_structure |
| R53 | S49 | – | 1 | 1: GO R54; | top_field_first |
| R54 | S50 | – | 1 | 1: GO R55; | frame_pred_frame_dct |
| R55 | S51 | – | 1 | 1: GO R56; | concealment_motion_vectors |
| R56 | S52 | – | 1 | 1: GO R57; | q_scale_type |
| R57 | S53 | – | 1 | 1: GO R58; | intra_vlc_format |
| R58 | S54 | – | 1 | 1: GO R59; | alternate_scan |
| R59 | S55 | – | 1 | 1: GO R60; | repeat_fist_field |
| R60 | S56 | – | 1 | 1: GO R61; | chroma_420_type |
| R61 | S57 | – | 1 | 1: GO R62; | progressive_frame |
| R62 | S58 | – | 1 | 1: GO RT; | composite_display_flag |
| R63 | S59 | 8 | 2 | 1: (C0==1) C61=0; C62=0; GO R64;<br>2: GO ERR; | slice_start_code |
| R64 | S60 | – | 1 | 1: GO R65; | slice_vertical_position_extension |
| R65 | S61 | – | 1 | 1: GO R66; | quantiser_scale_code |
| R66 | S62 | – | 1 | 1: GO R67; | slice_extension_flag/intra_slice |
| R67 | S63 | – | 1 | 1: C61=((C57<<7)+C56-1)*16 + C62-1;<br>C62=1; C73=0; C74=0; C75=0; GO RT; | macroblock_address_increment |

FIG. 43

| | | | | | |
|---|---|---|---|---|---|
| R68 | — | C62 | 2 | 1: (C62==0) GO R69;<br>2: GO R71; | MB loop |
| R69 | S64 | C0 | 2 | 1: (C0==1) GO R70;<br>2: (C0==0) C71=1; GO RT; | |
| R70 | S63 | — | 1 | 1: GO R71; | macroblock_address_increment |
| R71 | — | C62 | 2 | 1: (C62==1) GO R72;<br>2: C61++; C62—; C71=2; GO RT; | |
| R72 | S65 | — | 1 | 1: GO R73; | macroblock_type |
| R73 | S66 | C64 | 2 | 1: (C64&16) GO R74;<br>2: GO R75; | dct_type |
| R74 | S61 | — | 1 | 1: GO R75; | quantiser_scale_code |
| R75 | S67 | — | 1 | 1: C67=0; C61++;<br>C62—; C71=3; GO RT; | coded_block_pattern |
| R76 | S68 | C0 | 2 | 1: (C0==1) GO R77;<br>2: C67++; GO RT; | Block loop |
| R77 | | C67 | 2 | 1: (C67<4) GO R78;<br>2: GO R79; | |
| R78 | S69 | — | 1 | 1: GO R80; | DC_size for luma |
| R79 | S70 | — | 1 | 1: GO R80; | DC_size for chroma |
| R80 | S71 | — | 1 | 1: GO R81; | DC_diff |
| R81 | S72 | C0 | 2 | 1: (C0==1) C67++; GO RT;<br>2: GO ERR; | DCT coefficients |

FIG. 44

| Index | Flag | Element Name | Length/Type | Note |
|---|---|---|---|---|
| C0 | 1bit | Decoding OK | | |
| C1 | 1bit | horizontal_size | | |
| C2 | 1bit | vertical_size | | |
| C3 | 1bit | aspect_ratio_information | | |
| C4 | 1bit | frame_rate_code | | |
| C5 | 1bit | bit_rate_value | | |
| C6 | 1bit | vbv_buffer_size | | |
| C7 | 1bit | constrained_parameters_flag | | |
| C8 | 1bit | Intra quantiser matrix | 8 bitarray(64) | |
| C9 | 1bit | non_Intra quantiser matrix | 8 bitarray(64) | |
| C10 | 1bit | chroma_intra_quantizer_matrix | 8 bitarray(64) | |
| C11 | 1bit | chroma_non_intra_quantizer_matrix | 8 bitarray(64) | |
| C12 | 1bit | extension_start_code_ID | | |
| C13 | 1bit | profile_and_level_indication | | |
| C14 | 1bit | progressive_sequence | | |
| C15 | 1bit | chroma_format | | |
| C16 | 1bit | horizontal_size_extension | | |
| C17 | 1bit | vertical_size_extension | | |

FIG. 45

| | | | | |
|---|---|---|---|---|
| C18 | 1bit | bit_rate_extension | | |
| C19 | 1bit | vbv_buffer_size_extension | | |
| C20 | 1bit | low_delay | | |
| C21 | 1bit | frame_rate_extension_n | | |
| C22 | 1bit | frame_rate_extension_d | | |
| C23 | 1bit | frame_rate | | |
| C24 | 1bit | profile | | |
| C25 | 1bit | level | | |
| C26 | 1bit | bit_rate | | |
| C27 | 1bit | video_format | | |
| C28 | 1bit | color_primaries | | |
| C29 | 1bit | transfer_characteristics | | |
| C30 | 1bit | matrix_coefficients | | |
| C31 | 1bit | display_horizontal_size | | |
| C32 | 1bit | display_vertical_size | | |
| C33 | 1bit | drop_flag | | |
| C34 | 1bit | hour | | |
| C35 | 1bit | minute | | |
| C36 | 1bit | sec | | |

FIG. 46

| | | | | |
|---|---|---|---|---|
| C37 | 1bit | frame | | |
| C38 | 1bit | closed_gop | | |
| C39 | 1bit | broken_link | | |
| C40 | 1bit | temporal_reference | | |
| C41 | 1bit | picture_coding_type | | |
| C42 | 1bit | vbv_delay | | |
| C43 | 1bit | f_code | 4 bitArray (4) | |
| C44 | 1bit | intra_dc_precision | | |
| C45 | 1bit | picture_structure | | |
| C46 | 1bit | top_field_first | | |
| C47 | 1bit | frame_pred_frame_dct | | |
| C48 | 1bit | concealment_motion_vectors | | |
| C49 | 1bit | q_scale_type | | |
| C50 | 1bit | intra_vlc_format | | |
| C51 | 1bit | alternate_scan | | |
| C52 | 1bit | repeat_fist_field | | |
| C53 | 1bit | chroma_420_type | | |
| C54 | 1bit | progressive_frame | | |
| C55 | 1bit | composite_display_flag | | |

FIG. 47

| C56 | 1bit | slice_vertical_position | | |
|---|---|---|---|---|
| C57 | 1bit | slice_vertical_position_extension | | |
| C58 | 1bit | quantizer_scale_code | | |
| C59 | 1bit | quantizer_scale | | |
| C60 | 1bit | Intra_slice | | |
| C61 | 1bit | #MBA | | |
| C62 | 1bit | #MBAinc | | |
| C63 | 1bit | #MBAmax | | |
| C64 | 1bit | macroblock_type | | |
| C65 | 1bit | dct_type | | |
| C66 | 1bit | coded_block_pattern | | |
| C67 | 1bit | #B | | |
| C68 | 1bit | DCT DC size | | |
| C69 | 1bit | DCT DC differential | | |
| C70 | 1bit | DCT Coefficients | | |
| C71 | 1bit | Loop type | | |
| C72 | 1bit | Start_code_type | | |
| C73 | 1bit | dc_dct_pred[0] | | |
| C74 | 1bit | dc_dct_pred[1] | | |
| C75 | 1bit | dc_dct_pred[2] | | |

FIG. 48

| Index | FU name | input CSCI | output CSCI | Input data | Output data |
|---|---|---|---|---|---|
| F0 | SynP | 0 | 75 | | |
| F1 | DCR | 4 | 0 | QFS | QFSP |
| F2 | IS | 1 | 0 | QFSP | QF |
| F3 | IQ | 3 | 0 | QF | F |
| F4 | IT | 0 | 0 | F | f |
| F5 | VR | 3 | 0 | f | D |

FIG. 49

| Index | FU | Input CS/CI | No. of Branches | Branch information |
|---|---|---|---|---|
| R0 | F0(R0) | C72 | 2 | 1: (C72==4) GO END;<br>2: GO R1; |
| R1 | F0(R17) | – | 1 | 1: GO R2; |
| R2 | F0(R17) | – | 1 | 1: GO R3; |
| R3 | F0(R0) | C72 | 2 | 1: (C72==4) GO END;<br>2: GO R4; |
| R4 | F0(R0) | C72 | 2 | 1: (C72==4) GO END;<br>2: GO R5; |
| R5 | F0(R17) | – | 1 | 1: GO R6; |
| R6 | F0(R63) | – | 1 | 1: GO R7; |
| R7 | F0(R68) | C71 | 3 | 1: (C71==1) GO R6;<br>2: (C71==2) GO R7;<br>3: (C71==3) GO R8; |
| R8 | F0(R76) | C67 | 1 | 1: (C67<6) GO R8;<br>2: GO R9; |
| R9 | F1 | – | 1 | 1: GO R10; |
| R10 | F2 | – | 1 | 1: GO R11; |
| R11 | F3 | – | 1 | 1: GO R12; |
| R12 | F4 | – | 1 | 1: GO R13; |
| R13 | F5 | C61<br>C62 | 2 | 1: (C61>=C62) GO R3;<br>2: GO R7; |

FIG. 50

| Index No. | CSCI information | CSCI table element |
|---|---|---|
| F1-C1 | dc_dct_pred[0] | C73 |
| F1-C2 | dc_dct_pred[1] | C74 |
| F1-C3 | dc_dct_pred[2] | C75 |
| F1-C4 | intra_dc_precision | C44 |
| F2-C1 | alternate_scan | C51 |
| F3-C1 | intra_quantizer_matrix | C8 |
| F3-C2 | chroma_intra_quantizer_matrix | C10 |
| F3-C3 | quantizer_scale | C59 |
| F5-C1 | MBA | C61 |

DC Luma Table 0

| | |
|---|---|
| 1 | 2 |
| 1 | 2 |
| 1 | 2 |
| 1 | 2 |
| 1 | 2 |
| 1 | 2 |
| 1 | 2 |
| 1 | 2 |
| 2 | 2 |
| 2 | 2 |
| 2 | 2 |
| 2 | 2 |
| 2 | 2 |
| 2 | 2 |
| 2 | 2 |
| 2 | 2 |
| 0 | 3 |
| 0 | 3 |
| 0 | 3 |
| 0 | 3 |
| 3 | 3 |
| 3 | 3 |
| 3 | 3 |
| 3 | 3 |
| 4 | 3 |
| 4 | 3 |
| 4 | 3 |
| 4 | 3 |
| 5 | 3 |
| 5 | 3 |
| 6 | 3 |
| -1 | 0 |

[B]

DC Luma Table 1

| | |
|---|---|
| 7 | 6 |
| 7 | 6 |
| 7 | 6 |
| 7 | 6 |
| 7 | 6 |
| 7 | 6 |
| 7 | 6 |
| 7 | 6 |
| 8 | 7 |
| 8 | 7 |
| 8 | 7 |
| 8 | 7 |
| 9 | 8 |
| 9 | 8 |
| 10 | 9 |
| 11 | 9 |

DC Chroma Table 0

| | |
|---|---|
| 0 | 2 |
| 0 | 2 |
| 0 | 2 |
| 0 | 2 |
| 0 | 2 |
| 0 | 2 |
| 0 | 2 |
| 0 | 2 |
| 1 | 2 |
| 1 | 2 |
| 1 | 2 |
| 1 | 2 |
| 1 | 2 |
| 1 | 2 |
| 1 | 2 |
| 1 | 2 |
| 2 | 2 |
| 2 | 2 |
| 2 | 2 |
| 2 | 2 |
| 2 | 2 |
| 2 | 2 |
| 2 | 2 |
| 2 | 2 |
| 3 | 3 |
| 3 | 3 |
| 3 | 3 |
| 3 | 3 |
| 4 | 4 |
| 4 | 4 |
| 5 | 5 |
| -1 | 0 |

[D]

DC Chroma Table 1

| | |
|---|---|
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 6 | 6 |
| 7 | 7 |
| 7 | 7 |
| 7 | 7 |
| 7 | 7 |
| 7 | 7 |
| 7 | 7 |
| 7 | 7 |
| 7 | 7 |
| 8 | 8 |
| 8 | 8 |
| 8 | 8 |
| 8 | 8 |
| 9 | 9 |
| 9 | 9 |
| 10 | 10 |
| 11 | 10 |

| DCT Table 0a 1/2 | | | DCT Table 0a 2/2 | | |
|---|---|---|---|---|---|
| 65 | 0 | 6 | 0 | 6 | 8 |
| 65 | 0 | 6 | 12 | 1 | 8 |
| 65 | 0 | 6 | 11 | 1 | 8 |
| 65 | 0 | 6 | 3 | 2 | 8 |
| 2 | 2 | 7 | 1 | 3 | 8 |
| 2 | 2 | 7 | 0 | 5 | 8 |
| 9 | 1 | 7 | 10 | 1 | 8 |
| 9 | 1 | 7 | 0 | 3 | 5 |
| 0 | 4 | 7 | 0 | 3 | 5 |
| 0 | 4 | 7 | 0 | 3 | 5 |
| 8 | 1 | 7 | 0 | 3 | 5 |
| 8 | 1 | 7 | 0 | 3 | 5 |
| 7 | 1 | 6 | 0 | 3 | 5 |
| 7 | 1 | 6 | 0 | 3 | 5 |
| 7 | 1 | 6 | 0 | 3 | 5 |
| 7 | 1 | 6 | 4 | 1 | 5 |
| 6 | 1 | 6 | 4 | 1 | 5 |
| 6 | 1 | 6 | 4 | 1 | 5 |
| 6 | 1 | 6 | 4 | 1 | 5 |
| 6 | 1 | 6 | 4 | 1 | 5 |
| 1 | 2 | 6 | 4 | 1 | 5 |
| 1 | 2 | 6 | 4 | 1 | 5 |
| 1 | 2 | 6 | 4 | 1 | 5 |
| 1 | 2 | 6 | 3 | 1 | 5 |
| 5 | 1 | 6 | 3 | 1 | 5 |
| 5 | 1 | 6 | 3 | 1 | 5 |
| 5 | 1 | 6 | 3 | 1 | 5 |
| 5 | 1 | 6 | 3 | 1 | 5 |
| 13 | 1 | 8 | 3 | 1 | 5 |

[E]

DCT Table next

| | | |
|---|---|---|
| 0 | 2 | 4 |
| 2 | 1 | 4 |
| 1 | 1 | 3 |
| 1 | 1 | 3 |
| 64 | 0 | 2 |
| 64 | 0 | 2 |
| 64 | 0 | 2 |
| 64 | 0 | 2 |
| 0 | 1 | 2 |
| 0 | 1 | 2 |
| 0 | 1 | 2 |
| 0 | 1 | 2 |

FIG. 54
[G]

| DCT Table 0 1/5 | | | DCT Table 0 2/5 | | | DCT Table 0 3/5 | | | DCT Table 0 4/5 | | | DCT Table 0 5/5 | | |
|---|---|---|---|---|---|---|---|---|---|---|---|---|---|---|
| 65 | 0 | 6 | 1 | 2 | 5 | 64 | 0 | 4 | 0 | 1 | 2 | 0 | 2 | 3 |
| 65 | 0 | 6 | 3 | 1 | 5 | 64 | 0 | 4 | 0 | 1 | 2 | 0 | 2 | 3 |
| 65 | 0 | 6 | 3 | 1 | 5 | 64 | 0 | 4 | 0 | 1 | 2 | 0 | 2 | 3 |
| 65 | 0 | 6 | 3 | 1 | 5 | 64 | 0 | 4 | 0 | 1 | 2 | 0 | 2 | 3 |
| 7 | 1 | 7 | 3 | 1 | 5 | 64 | 0 | 4 | 0 | 1 | 2 | 0 | 2 | 3 |
| 7 | 1 | 7 | 3 | 1 | 5 | 64 | 0 | 4 | 0 | 1 | 2 | 0 | 2 | 3 |
| 8 | 1 | 7 | 3 | 1 | 5 | 0 | 3 | 4 | 0 | 1 | 2 | 0 | 2 | 3 |
| 8 | 1 | 7 | 3 | 1 | 5 | 0 | 3 | 4 | 0 | 1 | 2 | 0 | 2 | 3 |
| 6 | 1 | 7 | 3 | 1 | 5 | 0 | 3 | 4 | 0 | 1 | 2 | 0 | 2 | 3 |
| 6 | 1 | 7 | 1 | 1 | 3 | 0 | 3 | 4 | 0 | 1 | 2 | 0 | 2 | 3 |
| 2 | 2 | 7 | 1 | 1 | 3 | 0 | 3 | 4 | 0 | 1 | 2 | 0 | 2 | 3 |
| 2 | 2 | 7 | 1 | 1 | 3 | 0 | 3 | 4 | 0 | 1 | 2 | 0 | 2 | 3 |
| 0 | 7 | 6 | 1 | 1 | 3 | 0 | 3 | 4 | 0 | 1 | 2 | 0 | 2 | 3 |
| 0 | 7 | 6 | 1 | 1 | 3 | 0 | 3 | 4 | 0 | 1 | 2 | 0 | 2 | 3 |
| 0 | 7 | 6 | 1 | 1 | 3 | 0 | 3 | 4 | 0 | 1 | 2 | 0 | 2 | 3 |
| 0 | 7 | 6 | 1 | 1 | 3 | 0 | 3 | 4 | 0 | 1 | 2 | 0 | 2 | 3 |
| 0 | 6 | 6 | 1 | 1 | 3 | 0 | 3 | 4 | 0 | 1 | 2 | 0 | 4 | 5 |
| 0 | 6 | 6 | 1 | 1 | 3 | 0 | 3 | 4 | 0 | 1 | 2 | 0 | 4 | 5 |
| 0 | 6 | 6 | 1 | 1 | 3 | 0 | 3 | 4 | 0 | 1 | 2 | 0 | 4 | 5 |
| 0 | 6 | 6 | 1 | 1 | 3 | 0 | 3 | 4 | 0 | 1 | 2 | 0 | 4 | 5 |
| 4 | 1 | 6 | 1 | 1 | 3 | 0 | 3 | 4 | 0 | 1 | 2 | 0 | 4 | 5 |
| 4 | 1 | 6 | 1 | 1 | 3 | 0 | 3 | 4 | 0 | 1 | 2 | 0 | 4 | 5 |
| 4 | 1 | 6 | 1 | 1 | 3 | 0 | 1 | 2 | 0 | 1 | 2 | 0 | 4 | 5 |
| 4 | 1 | 6 | 1 | 1 | 3 | 0 | 1 | 2 | 0 | 1 | 2 | 0 | 4 | 5 |
| 5 | 1 | 6 | 1 | 1 | 3 | 0 | 1 | 2 | 0 | 1 | 2 | 0 | 5 | 5 |
| 5 | 1 | 6 | 1 | 1 | 3 | 0 | 1 | 2 | 0 | 1 | 2 | 0 | 5 | 5 |
| 5 | 1 | 6 | 1 | 1 | 3 | 0 | 1 | 2 | 0 | 1 | 2 | 0 | 5 | 5 |
| 5 | 1 | 6 | 1 | 1 | 3 | 0 | 1 | 2 | 0 | 1 | 2 | 0 | 5 | 5 |
| 1 | 5 | 8 | 1 | 1 | 3 | 0 | 1 | 2 | 0 | 1 | 2 | 0 | 5 | 5 |
| 11 | 1 | 8 | 1 | 1 | 3 | 0 | 1 | 2 | 0 | 1 | 2 | 0 | 5 | 5 |
| 0 | 11 | 8 | 1 | 1 | 3 | 0 | 1 | 2 | 0 | 1 | 2 | 0 | 5 | 5 |
| 0 | 10 | 8 | 1 | 1 | 3 | 0 | 1 | 2 | 0 | 1 | 2 | 0 | 5 | 5 |
| 13 | 1 | 8 | 1 | 1 | 3 | 0 | 1 | 2 | 0 | 1 | 2 | 9 | 1 | 7 |
| 12 | 1 | 8 | 1 | 1 | 3 | 0 | 1 | 2 | 0 | 1 | 2 | 9 | 1 | 7 |
| 3 | 2 | 8 | 1 | 1 | 3 | 0 | 1 | 2 | 0 | 1 | 2 | 1 | 3 | 7 |
| 1 | 4 | 8 | 1 | 1 | 3 | 0 | 1 | 2 | 0 | 2 | 3 | 1 | 3 | 7 |
| 2 | 1 | 5 | 1 | 1 | 3 | 0 | 1 | 2 | 0 | 2 | 3 | 10 | 1 | 7 |
| 2 | 1 | 5 | 1 | 1 | 3 | 0 | 1 | 2 | 0 | 2 | 3 | 10 | 1 | 7 |
| 2 | 1 | 5 | 1 | 1 | 3 | 0 | 1 | 2 | 0 | 2 | 3 | 0 | 8 | 7 |
| 2 | 1 | 5 | 1 | 1 | 3 | 0 | 1 | 2 | 0 | 2 | 3 | 0 | 8 | 7 |
| 2 | 1 | 5 | 1 | 1 | 3 | 0 | 1 | 2 | 0 | 2 | 3 | 0 | 9 | 7 |
| 2 | 1 | 5 | 64 | 0 | 4 | 0 | 1 | 2 | 0 | 2 | 3 | 0 | 9 | 7 |
| 2 | 1 | 5 | 64 | 0 | 4 | 0 | 1 | 2 | 0 | 2 | 3 | 0 | 12 | 8 |
| 2 | 1 | 5 | 64 | 0 | 4 | 0 | 1 | 2 | 0 | 2 | 3 | 0 | 13 | 8 |
| 1 | 2 | 5 | 64 | 0 | 4 | 0 | 1 | 2 | 0 | 2 | 3 | 2 | 3 | 8 |
| 1 | 2 | 5 | 64 | 0 | 4 | 0 | 1 | 2 | 0 | 2 | 3 | 4 | 2 | 8 |
| 1 | 2 | 5 | 64 | 0 | 4 | 0 | 1 | 2 | 0 | 2 | 3 | 0 | 14 | 8 |
| 1 | 2 | 5 | 64 | 0 | 4 | 0 | 1 | 2 | 0 | 2 | 3 | 0 | 15 | 8 |
| 1 | 2 | 5 | 64 | 0 | 4 | 0 | 1 | 2 | 0 | 2 | 3 | | | |
| 1 | 2 | 5 | 64 | 0 | 4 | 0 | 1 | 2 | 0 | 2 | 3 | | | |
| 1 | 2 | 5 | 64 | 0 | 4 | 0 | 1 | 2 | 0 | 2 | 3 | | | |

DCT Table 1a

| | | |
|---|---|---|
| 16 | 1 | 10 |
| 5 | 2 | 10 |
| 0 | 7 | 10 |
| 2 | 3 | 10 |
| 1 | 4 | 10 |
| 15 | 1 | 10 |
| 14 | 1 | 10 |
| 4 | 2 | 10 |

[I]

DCT Table 1

| | | |
|---|---|---|
| 5 | 2 | 9 |
| 5 | 2 | 9 |
| 14 | 1 | 9 |
| 14 | 1 | 9 |
| 2 | 4 | 10 |
| 16 | 1 | 10 |
| 15 | 1 | 9 |
| 15 | 1 | 9 |

[J]

DCT Table 2

| | | |
|---|---|---|
| 0 | 11 | 12 |
| 8 | 2 | 12 |
| 4 | 3 | 12 |
| 0 | 10 | 12 |
| 2 | 4 | 12 |
| 7 | 2 | 12 |
| 21 | 1 | 12 |
| 20 | 1 | 12 |
| 0 | 9 | 12 |
| 19 | 1 | 12 |
| 18 | 1 | 12 |
| 1 | 5 | 12 |
| 3 | 3 | 12 |
| 0 | 8 | 12 |
| 6 | 2 | 12 |
| 17 | 1 | 12 |

[K]

DCT Table 3

| | | |
|---|---|---|
| 10 | 2 | 13 |
| 9 | 2 | 13 |
| 5 | 3 | 13 |
| 3 | 4 | 13 |
| 2 | 5 | 13 |
| 1 | 7 | 13 |
| 1 | 6 | 13 |
| 0 | 15 | 13 |
| 0 | 14 | 13 |
| 0 | 13 | 13 |
| 0 | 12 | 13 |
| 26 | 1 | 13 |
| 25 | 1 | 13 |
| 24 | 1 | 13 |
| 23 | 1 | 13 |
| 22 | 1 | 13 |

[L]

DCT Table 4

| | | |
|---|---|---|
| 0 | 31 | 14 |
| 0 | 30 | 14 |
| 0 | 29 | 14 |
| 0 | 28 | 14 |
| 0 | 27 | 14 |
| 0 | 26 | 14 |
| 0 | 25 | 14 |
| 0 | 24 | 14 |
| 0 | 23 | 14 |
| 0 | 22 | 14 |
| 0 | 21 | 14 |
| 0 | 20 | 14 |
| 0 | 19 | 14 |
| 0 | 18 | 14 |
| 0 | 17 | 14 |
| 0 | 16 | 14 |

DCT Table 5

| | | |
|---|---|---|
| 0 | 40 | 15 |
| 0 | 39 | 15 |
| 0 | 38 | 15 |
| 0 | 37 | 15 |
| 0 | 36 | 15 |
| 0 | 35 | 15 |
| 0 | 34 | 15 |
| 0 | 33 | 15 |
| 0 | 32 | 15 |
| 1 | 14 | 15 |
| 1 | 13 | 15 |
| 1 | 12 | 15 |
| 1 | 11 | 15 |
| 1 | 10 | 15 |
| 1 | 9 | 15 |
| 1 | 8 | 15 |

[N]

DCT Table 6

| | | |
|---|---|---|
| 1 | 18 | 16 |
| 1 | 17 | 16 |
| 1 | 16 | 16 |
| 1 | 15 | 16 |
| 6 | 3 | 16 |
| 16 | 2 | 16 |
| 15 | 2 | 16 |
| 14 | 2 | 16 |
| 13 | 2 | 16 |
| 12 | 2 | 16 |
| 11 | 2 | 16 |
| 31 | 1 | 16 |
| 30 | 1 | 16 |
| 29 | 1 | 16 |
| 28 | 1 | 16 |
| 27 | 1 | 16 |

DEVICE AND METHOD FOR UNIFIED CODES

This application is a Continuation of copending PCT International Application No. PCT/KR2007/001542 filed on Mar. 29, 2007, which designated the United States, and on which priority is claimed under 35 U.S.C. §120. This application also claims priority under 35 U.S.C. §119(a) on Patent Application No(s). 10-2006-0029937 and 10-2006-0065139 filed in Korea, Republic of on Mar. 31, 2006 and Jul. 11, 2006; respectively. The entire contents of each of the above documents is hereby incorporated by reference.

TECHNICAL FIELD

The present invention relates to a unified codec, more specifically to a unified codec device and method that can be universally used for various encoding/decoding standards.

BACKGROUND ART

Typically, moving picture data is converted into bit-stream data by an encoder. At this time, the bit-stream is stored depending on a coding type that satisfies the constraint condition of the encoder.

MPEG, which is the constraint condition of the encoder, requests syntax and semantics.

The syntax, which refers to the structure, format, or length of data, shows the order of expressing the data. In other words, the syntax is to meet the condition for an encoding/decoding operation and defines the sequence, length and format of each data in the elements of the bit stream.

The semantics refers to the meaning of each bit forming data. In other words, the semantics shows the meaning of each element in the bit stream.

Accordingly, various types of bit streams can be generated depending on the encoding condition or the applied standard (or codec) of the encoder. Typically, each standard (e.g. MPEG-1, MPEG-2, MPEG-4, and MPEG-4 AVC) has different bit stream syntax.

Therefore, it can be said that the bit stream encoded according to each standard or encoding condition has different types (i.e. syntax and semantics). A decoder corresponding to a pertinent encoder must be used for the deciding of the bit stream.

As described above, the conventional bit stream decoder has a restriction that must satisfy the constraint condition of the encoder. This restriction makes it difficult to realize an integration decoder corresponding to a plurality of standards.

DISCLOSURE

Technical Problem

The present invention, which is contrived to solve the aforementioned problems, provides a unified codec device and method that can decode a bit steam encoded by various types (syntax and semantics) in accordance with each standard (e.g. MPEG-1, MPEG-2, MPEG-4, MPEG-4 AVC) by using the same information recognizing method.

The present invention provides a unified codec device and method that can parse a bit stream compressed by various methods by using the same information analyzing method and organically control each functional unit for decoding by using the parsed data.

The present invention provides a unified codec device and method that can commonly apply a syntax analyzing method for decoding various types of bit streams.

The present invention provides a unified codec device and method that can apply a set of new commands for being capable of parsing a bit stream in various forms by using a common syntax analyzing method.

The present invention provides a unified codec device and method that can easily decode a bit stream when a syntax element is changed, added or deleted.

The present invention provides a unified codec device and method that can share elements used for the bit strain decoding of the element information (i.e. a result from syntax parsing) of analyzed syntax.

The present invention provides a unified codec device and method that can use the element information of analyzed syntax to analyze following bit stream syntax element.

The present invention provides a unified codec device and method that can divide the functions forming various decoding methods suggested by diverse standards (codecs) per each functional unit and store the divided functions in a toolbox.

The present invention provides a unified codec device and method that can select in a toolbox and decode a functional unit necessary for decoding a bit stream encoded in various forms.

The present invention provides a unified codec device and method that can change, add or delete a functional unit stored in a tool box.

In addition, the present invention provides a unified codec device and method that can internationally standardize the concept and structure of codec unification for bit stream decoding. Other problems that the present invention solves will become more apparent through the following description related to some embodiments.

Technical Solution

To solve the above problems, an aspect of the present invention features a unified codec device and method According to an embodiment of the present invention, a decoding device can include a table storing unit; a decoding description decoder, generating and storing in the table storing unit n tables corresponding to an inputted decoding description, n being a natural number; and a codec unit, decoding and outputting encoded video data, included in a bit-stream inputted corresponding to the decoding description, to moving picture data by using the table stored in the table storing unit.

The codec unit can include a toolbox, including a plurality of functional units, respectively, realized to perform a predetermined process; a control signal/context information storing unit, storing a plurality of information generated by the bit-stream syntax-parsed by at least one of the plurality of functional units; and a connection control unit, referring to at least one of predetermined tables, recognizing the processing order of the plurality of functional units and controlling to activate a corresponding functional unit.

A predetermined process of the functional units, respectively, can be realized to independently perform each function suggested by a plurality of standards for decoding the bit-stream.

If video data is encoded by the plurality of standards, the connection control unit can refer to the table, successively activates the plurality of functional units performing the processes according to the plurality of standards and decode the encoded video data to the moving picture data.

The toolbox can include a parsing unit, generating and storing in the CSCI storing unit a plurality of element information by the syntax parsing of the bit-stream, and generating the encoded video data to macro block data having a predetermining size and successively outputting the macro block data, a plurality of processing functional units, designated with each process to be performed for converting the macro block data into the moving picture data.

The n tables can include a syntax element table (SET) indicating a process for generating information related to a bit-stream syntax and element information corresponding to the bit-stream syntax; a syntax rule table (S-RT), indicating the connection between the bit-stream syntaxes; a control signal and context information table (CSCIT), indicating detailed information related to the element information, a FU-rule table (F-RT), successively selecting the plurality of functional units; a FU list (FL), indicating a list of the functional units; and a FU-CSCIT, indicating element information to be inputted into the selected functional unit.

The syntax element table (SET), the syntax rule table (S-RT) and the FU-rule table (F-RT) can be configured to comprise at least one of a READ command, reading k bits, k being a natural number, by moving a file pointer; a SEEK command, the k bit without moving the file pointer; a FLUSH command, moving the file pointer as much as the k bits, a GO command, directing to the branching between indexes; and a SET command, setting a flag of element information.

The decoding device can further include a default value table (DVT) indicating the relation between an actual value and a code value when entropy coding.

The connection control unit can designate the order of activating a plurality of selected functional units among the parsing functional unit and a plurality of processing functional units by using the F-RT.

The processing functional unit, activated by the connection control unit, can perform a predetermined process by using predetermined element information and output data by a prior functional unit.

The parsing functional unit can generate the element information by using the SET, the S-RT and the CSCIT.

The decoding device can further include a dividing unit for dividing the decoding description and the bit-stream if a universal bit-stream unified with the decoding description and the bit-stream is inputted.

The decoding description can include at least one table part, and at least one table information for forming the table can be inserted into each table part.

The table information can include a codec number for decoding the bit-stream, and designating information corresponding to a profile and level number, and the decoding description decoder can extract n tables, corresponding to the designating information, from a plurality of tables pre-stored in the table storing unit.

The table information inserted into the n table parts, respectively, can include binary code information for forming each table, and the decoding description decoder generates n tables by using the binary code information and stores the generated n tables in the table storing unit M table parts, m being a natural number, of the n table parts can include a codec number related to a corresponding table and designating information corresponding to a profile and level number, and k table parts, k being a number of n-m, comprises binary code information, and the decoding description decode can extract m tables, corresponding to the designating information, from a plurality of pre-stored tables and generate k tables by using the binary code information and stores the k generated tables in the table storing unit.

According to another embodiment of the present invention, a decoding device can includes a table storing unit, storing a plurality of tables organically linked; a syntax parser, storing a plurality of element information, generated by the syntax-parsing of an inputted bit-stream, in an element information storing unit, and successively outputting macro block data corresponding to encoded video data; an MB processing unit, including a plurality of functional units realized to process each predetermined processing operation; and a connection control unit, controlling to selectively activate the plurality of functional units by referring to at least one table stored in the table storing unit. Here, an arbitrary functional unit, activated by the connection control unit, can process and output the macro block data by using predetermined element information of element information stored in the element information storing unit A predetermined process of the functional units, respectively, can be realized to independently perform each function suggested by a plurality of standards for decoding the bit-stream.

The connection control unit can control the operation of the syntax parser by referring to a predetermined table The decoding device can further include a decoding description decoder, generating n tables, n being a natural number, corresponding to a decoding description if the decoding description is further inputted, the decoding description corresponding to the bit-stream.

The decoding device can further include a dividing unit, for dividing the decoding description and the bit-stream and inputting the decoding description and the bit-stream into the syntax parser and the decoding description decoder, respectively, if a universal bit-stream, unified with the decoding description and the bit-stream, is inputted.

The description information can be inputted in a form of separate data or a bit-stream.

The connection control unit can control the result data of a corresponding activated functional unit to be inputted into the following activated functional unit, or a corresponding activated functional unit can store its result data in a buffer memory that can be accessed by the following activated functional unit.

Macro block data, successively outputted by the syntax parser, can be written in the buffer memory.

The description information can be formed in a binary code.

The description information can include a syntax element table (SET) indicating a process for generating information related to a bit-stream syntax and element information corresponding to the bit-stream syntax; a syntax rule table (S-RT), indicating the connection between the bit-stream syntaxes; a control signal and context information table (CSCIT), indicating detailed information related to the element information, a FU-rule table (F-RT), successively selecting the plurality of functional units; a FU list (FL), indicating a list of the functional units; and a FU-CSCIT, indicating element information to be inputted into the selected functional unit.

The syntax element table (SET), the syntax rule table (S-RT) and the FU-rule table (F-RT) can be configured to comprise at least one of a READ command, reading k bits, k being a natural number, by moving a file pointer; a SEEK command, the k bit without moving the file pointer; a FLUSH command, moving the file pointer as much as the k bits, a GO command, directing to the branching between indexes; and a SET command, setting a flag of element information.

The decoding device can further include a default value table (DVT) indicating the relation between an actual value and a code value when entropy coding.

The syntax parser can select a bit-stream syntax to be processed by using the S-RT, can generate the element information by using the processor written in the SET and store the generated element information in the element information storing unit, corresponding to the CSCIT The connection control unit can select the syntax parser or any one of functional units by using the F-RT, recognize the property of the syntax parser or the functional unit by using the FL, extract from the element information storing unit element information to be inputted into the selected functional unit by using the FU-CSCIT and the CSCIT and input the extracted element information into the selected functional unit According to another embodiment of the present invention, a decoding device can include an encoding unit, converting inputted moving picture into a bit-stream according to a predetermined encoding method by successively using a plurality of functional units; and a description information generating unit, generating syntax information of the bit-stream and description information according to the connection of the functional units. Here, the bit-stream and the description information can be provided to a decoding device.

The bit-stream and the description information can be generated as one universal bit-stream and provided to the decoding device. The description information is provided in a form of separate data or a bit-stream to the decoding device.

The description information can include a syntax element table (SET) indicating a process for generating information related to a bit-stream syntax and element information corresponding to the bit-stream syntax; a syntax rule table (S-RT), indicating the connection between the bit-stream syntaxes; a control signal and context information table (CSCIT), indicating detailed information related to the element information, a FU-rule table (F-RT), successively selecting the plurality of functional units; a FU list (FL), indicating a list of the functional units; and a FU-CSCIT, indicating element information to be inputted into the selected functional unit.

The encoding device can further include a default value table (DVT) indicating the relation between an actual value and a code value when entropy coding.

According to another embodiment of the present invention, a decoding device can include a table storing unit, storing at least one table information; a decoding description decoder, generating and storing in the table storing unit n table information, n being zero or a natural number and the same as or smaller than m, corresponding to the decoding description received from an encoder, or selecting k table information, k being a number of m-n, from the table storing unit; and a codec unit, generating and outputting moving picture data corresponding to encoded video data in the bit-stream received from the encoder by using m table information, m being a natural number and the same as or larger than n, generated or selected by the decoding description decoder.

If the decoding description includes a codec number encoded with the bit-stream and designating information corresponding to a profile and level number, the m table information can be selected in the table storing unit.

The decoding description can include m table parts, and table information forming the table can be inserted into each table part.

If the table part corresponding to arbitrary table information includes generation information, the decoding description decoder can newly generate a corresponding table by using the generation information.

If the table part corresponding to arbitrary table information includes changing information, the decoding description decoder can change a corresponding table by using the changing information If the table part corresponding to arbitrary table information further includes a codec number and a profile and level number, or if the codec number and the profile and level number is included before the table part, the decoding description decoder can change the table information corresponding to the codec by using the changing information.

The codec unit can include a toolbox, including a plurality of functional units, respectively, realized to perform a predetermined process; a control signal/context information (CSCI) storing unit, storing a plurality element information generated by the bit-stream syntax-parsed by at least one functional unit of the plurality of functional units; and a connection control unit, recognizing the processing order of the plurality of functional units by referring to at least one of predetermined tables, and controlling to activate the corresponding functional unit.

A predetermined process of the functional units, respectively, can be realized to independently perform each function suggested by a plurality of standards for decoding the bit-stream.

If video data is encoded by the plurality of standards, the connection control unit refers to the table, can successively activate the plurality of functional units performing the processes according to the plurality of standards and decodes the encoded video data to the moving picture data.

The toolbox can include a parsing unit, generating and storing in the CSCI storing unit a plurality of element information by the syntax parsing of the bit-stream, and generating the encoded video data to macro block data having a predetermining size and successively outputting the macro block data, a plurality of processing functional units, designated with each process to be performed for converting the macro block data into the moving picture data.

The in tables can include a syntax element table (SET) indicating a process for generating information related to a bit-stream syntax and element information corresponding to the bit-stream syntax; a syntax rule table (S-RT), indicating the connection between the bit-stream syntaxes; a control signal and context information table (CSCIT), indicating detailed information related to the element information, a FU-rule table (F-RT), successively selecting the plurality of functional units; a FU list (FL), indicating a list of the functional units; and a FU-CSCIT, indicating element information to be inputted into the selected functional unit.

The syntax element table (SET), the syntax rule table (S-RT) and the FU-rule table (F-RT) can be configured to include at least one of a READ command, reading s bits, s being a natural number, by moving a file pointer; a SEEK command, the k bit without moving the file pointer; a FLUSH command, moving the file pointer as much as the k bits, a GO command, directing to the branching between indexes; and a SET command, setting a flag of element information.

The decoding device can further include a default value table (DVT) indicating the relation between an actual value and a code value when entropy coding.

The connection control unit can designate the order of activating a plurality of selected functional units among the parsing functional unit and a plurality of processing functional units by using the F-RT.

The processing functional unit, activated by the connection control unit, can perform a predetermined process by using predetermined element information and output data by a prior functional unit.

The parsing functional unit can generate the element information by using the SET, the S-RT and the CSCIT.

The decoding device can further include a dividing unit for dividing the decoding description and the bit-stream if a universal bit-stream unified with the decoding description and the bit-stream is received from the encoder.

According to another embodiment of the present invention, a decoding device can include an input unit, receiving a bit-stream and description information; a table storing unit, storing a table corresponding to the decoding description; and a codec unit, decoding the bit-stream by using the table stored in the table storing unit. The decoding description can include information related to the connection between syntax information of the bit-stream and functional units included in the codec.

The decoding description can include at least one table part, and at least one table information for forming or identifying the table can be inserted into each table part.

The table information can include a codec number for decoding the bit-stream, and designating information corresponding to a profile and level number, and the decoding description decoder can extract n tables, corresponding to the designating information, from a plurality of tables pre-stored in the table storing unit.

The table information inserted into the n table parts, respectively, can include binary code information for forming each table, and the decoding description decoder can generate the binary code information by using n tables and store the generated binary code information in the table storing unit.

M table parts, m being a natural number, of the n table parts can include a codec number related to a corresponding table and designating information corresponding to a profile and level number, and k table parts, k being a number of n-m, comprises binary code information, and the decoding description decode can extract m tables, corresponding to the designating information, from a plurality of pre-stored tables and generate k tables by using the binary code information and stores the k generated tables in the table storing unit.

The codec unit can include a toolbox, including a plurality of functional units, respectively, realized to perform a predetermined process; a control signal/context information (CSCI) storing unit, storing a plurality element information generated by the bit-stream syntax-parsed by at least one functional unit of the plurality of functional units; and a connection control unit, recognizing the processing order of the plurality of functional units by referring to at least one of predetermined tables, and controlling to activate the corresponding functional unit.

The n tables can include a syntax element table (SET) indicating a process for generating information related to a bit-stream syntax and element information corresponding to the bit-stream syntax; a syntax rule table (S-RT), indicating the connection between the bit-stream syntaxes; a control signal and context information table (CSCIT), indicating detailed information related to the element information, a FU-rule table (F-RT), successively selecting the plurality of functional units; a FU list (FL), indicating a list of the functional units; and a FU-CSCIT, indicating element information to be inputted into the selected functional unit.

The decoding device can further include a default value table (DVT) indicating the relation between an actual value and a code value when entropy coding.

According to another embodiment of the present invention, a decoding device can include a toolbox, including a plurality of functional units, respectively, realized to perform a predetermined process; a control signal/context information storing unit, storing a plurality of information generated by the bit-stream syntax-parsed by at least one of the plurality of functional units; and a connection control unit, referring to at least one of predetermined tables, recognizing the processing order of the plurality of functional units and controlling to activate a corresponding functional unit. Here, a corresponding activated functional unit can store its result data in a buffer memory that can be accessed by the following activated functional unit.

The decoding device can further include a decoding description decoder, generating at least one table by referring to the inputted decoding description and storing the generated table in the table storing unit, or selecting n tables from the tables pre-stored in the table storing unit. Here, the decoding description includes information related to the connection between syntax information of the bit-stream and functional units included in the codec.

The decoding description can further include information related to at least one of an address of a buffer memory, written with input data to be read by the activated, and another address of the buffer memory, to be written with the result data processed by the functional unit.

The tables, stored in the table storing unit, can include a syntax element table (SET) indicating a process for generating information related to a bit-stream syntax and element information corresponding to the bit-stream syntax; a syntax rule table (S-RT), indicating the connection between the bit-stream syntaxes; a control signal and context information table (CSCIT), indicating detailed information related to the element information, a FU-rule table (F-RT), successively selecting the plurality of functional units; a FU list (FL), indicating a list of the functional units; and a FU-CSCIT, indicating element information to be inputted into the selected functional unit.

The decoding device can further include a default value table (DVT) indicating the relation between an actual value and a code value when entropy coding.

According to another embodiment of the present invention, a decoding device can include a decoding description decoder, generating at least one table by using inputted decoding description; and a codec unit, decoding and outputting encoded video data, included in an inputted bit-stream, to moving picture data by using the table.

The decoding device can further include a table storing unit for storing at least one table generated by the decoding description decoder.

The codec unit can include a buffer memory for storing intermediate data generated in the operation that the encoded video data is decoded to the moving picture data.

Another aspect of the present invention features a decoding method and a recorded medium recorded a program for executing the method thereof.

According to an embodiment of the present invention, a decoding method can include (a) receiving a bit-stream and description information; (b) generating and storing a plurality of tables corresponding to the description information; (c) storing in an element information storing unit a plurality of element information generated by the syntax parsing of the bit-stream by using at least one table; (d) converting encoded video data of the bit-stream into macro block data of a predetermined size and successively outputting the macro block data; (e) activating an arbitrary functional unit by referring to at least one table information; and (f) the activated functional unit performing a predetermined process by using element information stored in the element information storing unit and outputting its result data. Here, the steps of (e) and (f) are repeated until the result data is moving picture data corresponding to the encoded video data.

A predetermined process of the functional units, respectively, can be realized to independently perform each function suggested by a plurality of standards for decoding the bit-stream.

If the element information, requested to the functional unit to be selected in the step of (e), can be not stored in the element storing unit while the steps of (e) and (f) are repeated, the step of (b) is performed again, and then, the steps of (e) and (i) start to be repeated.

A corresponding activated functional unit can store its result data in a buffer memory that can be accessed by the following activated functional unit.

Macro block data, successively outputted in the step of (b), is written in the buffer memory.

The description information can include a syntax element table (SET) indicating a process for generating information related to a bit-stream syntax and element information corresponding to the bit-stream syntax; a syntax rule table (S-RT), indicating the connection between the bit-stream syntaxes; a control signal and context information table (CSCIT), indicating detailed information related to the element information, a FU-rule table (F-RT), successively selecting the plurality of functional units; a FU list (FL), indicating a list of the functional units; and a FU-CSCIT, indicating element information to be inputted into the selected functional unit.

The decoding method can further include a default value table (DVT) indicating the relation between an actual value and a code value when entropy coding.

The SET, the S-RT, the CSCIT and the DVT can be used in the step of (c).

The functional unit for performing the steps of (c), (d) and (f) can be determined by the F-RT.

The step of (c) can include (g) selecting a bit-stream syntax to be processed by using the S-RT; (h) generating the element information by using the process written in the SET; and (i) storing the generated element information in the element information storing unit, corresponding to the CSCIT. Here, the steps of (g) and (i) can be repeated until element information corresponding to all bit-stream syntaxes is generated and stored If the bit-stream and the description information is inputted as one universal bit-stream, the step of (b) can be performed prior to the step of dividing the bit-stream and the description information from the universal bit-stream.

The description information can be inputted in a form of separate data or a bit-stream. The description information is formed in a binary code.

According to another embodiment of the present invention, a decoding method can include (a) converting inputted moving picture into a bit-stream according to a predetermined encoding method by successively using a plurality of functional units; (b) generating syntax information of the bit-stream and description information according to the connection of the functional units; and (c) providing the bit-stream and the description information to a decoding device.

The step (c) can include generating the bit-stream and the description information as one universal bit-stream; and providing the universal bit-stream to the decoding device According to another embodiment of the present invention, a recorded medium having recorded a program including a typicalized command for performing a decoding method, the command being executable in a decoding device, and the recorded medium being readable by the decoding device, including (a) generating and storing a plurality of tables corresponding to the description information; (b) storing a plurality of element information generated by the syntax parsing of an inputted bit-stream by using at least one of the stored tables; (c) converting encoded video data of the bit-stream into macro block data of a predetermined size and successively outputting the macro block data; (d) a process, to be performed for converting the macro block data into the moving picture data, calling one processing functional unit by referring to at least one of the stored table information among each of the plurality of designated processing unit. Here, the called processing unit can output the result data of the designated process by using predetermined element information of the plurality of stored element information, and the step of (d) is repeated until the result data is the moving picture data corresponding to the encoded video data.

If the element information, requested to the functional unit to be selected in the step of (d), is not stored in the element storing unit while the step of (d) are repeated, the step of (b) can be performed again, and then, the step of (d) can start to be repeated A predetermined process of the processing functional units, respectively, can be realized to independently perform each function suggested by a plurality of standards for decoding the bit-stream.

DESCRIPTION OF DRAWINGS

FIG. 17 through FIG. 56 are examples illustrating each table in accordance with embodiments of the present invention.

MODE FOR INVENTION

Figure 1:
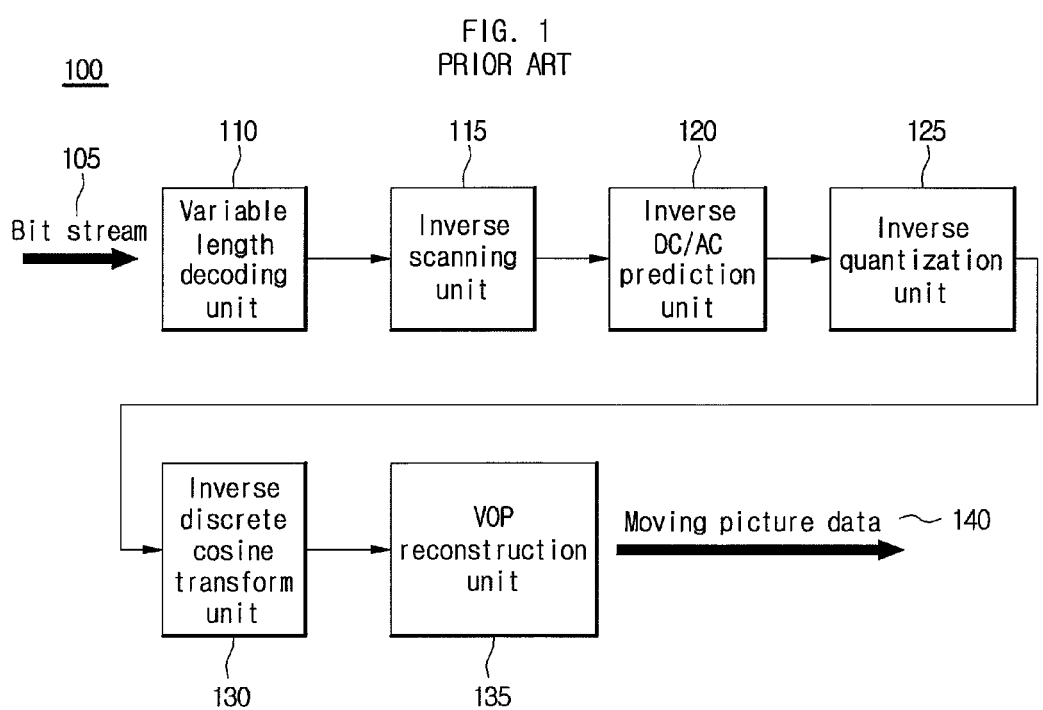
FIG. 1 is a simplified block diagram illustrating the structure of a typical decoder.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

Figure 2:
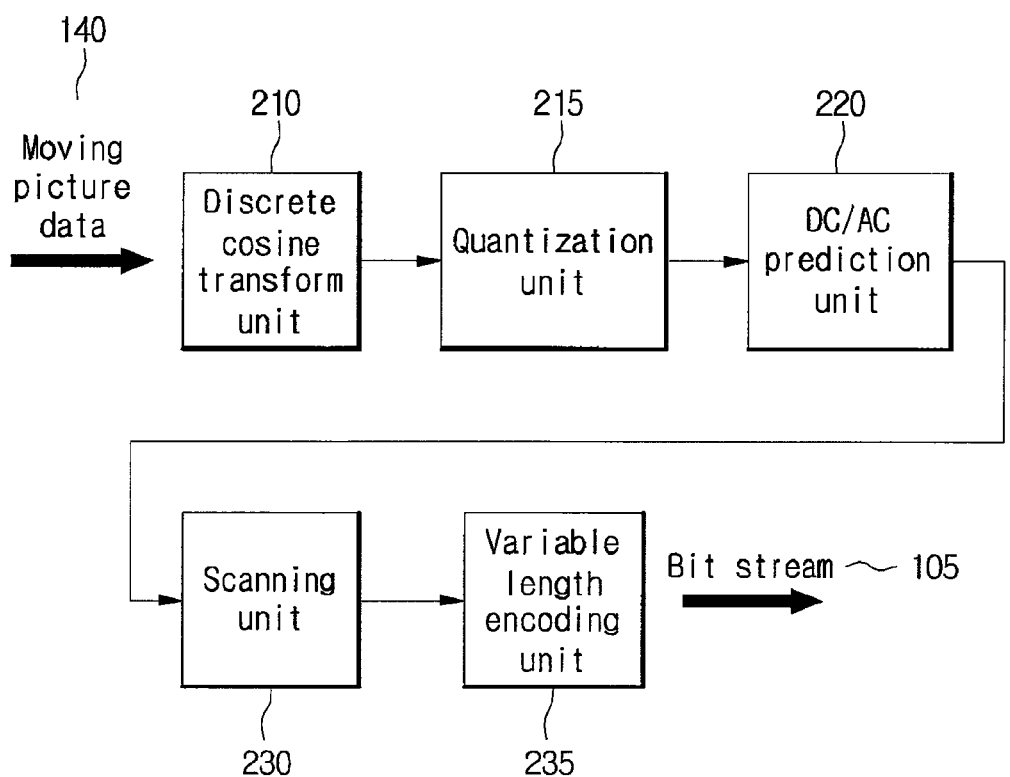
FIG. 2 is a simplified block diagram illustrating the structure of a typical encoder.

FIG. 1 is a simplified block diagram illustrating the structure of a typical decoder, and FIG. 2 is a simplified block diagram illustrating the structure of the typical encoder.

As illustrated in FIG. 1, an MPEG-4 decoder 100 typically includes a variable length decoding unit 110, an inverse scanning unit 115, an inverse DC/AC prediction unit 120, an inverse quantization unit 125, an inverse discrete cosine transform unit 130 and a VOP reconstruction unit 135. It shall be evident that the decoder 100 can have a structure changed depending on an applied standard and some elements can be replaced with other elements.

If a transferred bit stream is syntax-parsed and corresponding header information and a corresponding image data are extracted, the variable length decoding unit 110 forms a quantized discrete cosine transform (DCT) coefficient by using predetermined Huffman table, the inverse scanning unit 115 generates data having the same order as pertinent moving picture data 140 by performing inverse scanning. In other words, the inverse scanning unit 115 outputs a value in inverse order of being scanned by various methods. In the encoding, after performing the quantization, a scanning direction can be defined depending on the distribution of a frequency band. Typically, a zig-zag scanning method can be used, but various scanning methods per codec can be used.

Syntax parsing can be unifiedly performed in the variable length decoding unit 110 or in an element for processing the bit stream prior to the variable length decoding unit 110. In this case, since the same standard is applied to the corresponding encoder and decoder, the syntax parsing is processed by a predetermined criterion only, to correspond to the pertinent standard.

The inverse DC/AC prediction unit 120 determines the direction of a reference block for prediction by using the size of the DCT coefficient at a frequency band.

The inverse quantization unit 125 performs the inverse quantization of inverse-scanned data. In other words, the inverse quantization unit 125 returns DC and AC coefficients by using a quantization parameter (QP) designed in an encoding process.

The inverse discrete cosine transform unit 130 calculates an actual moving picture data pixel value to generate a video object plane (VOP) by performing inverse discrete cosine transform.

The VOP reconstruction unit 135 decodes a moving picture signal by using the VOP generated by the inverse discrete cosine transform unit 130 and outputs the decoded moving picture signal.

As illustrated in FIG. 2, an MPEG-4 encoder 200 typically includes a discrete cosine transform unit 210, a quantization unit 215, a DC/AC prediction unit 220, a scanning unit 230 and a variable length encoding unit 235.

Figure 3:
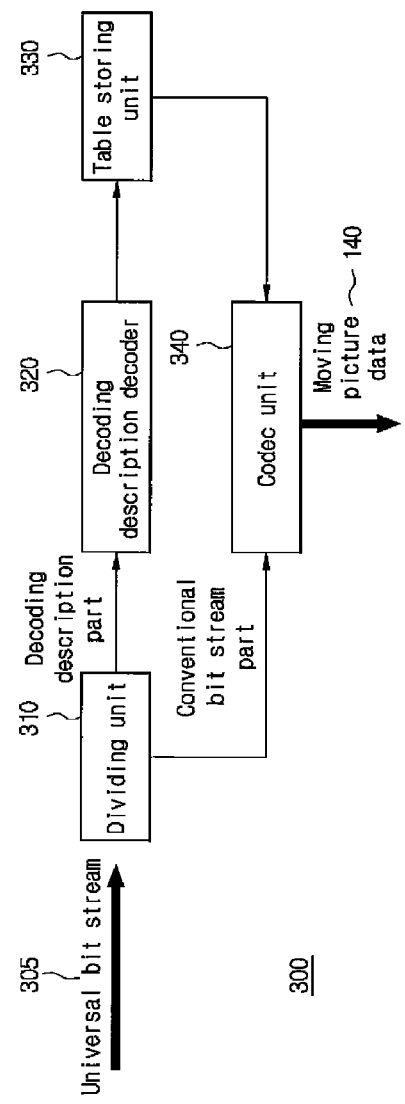
FIG. 3 is a simplified block diagram illustrating the structure of a decoder in accordance with an embodiment of the present invention.
Figure 4:
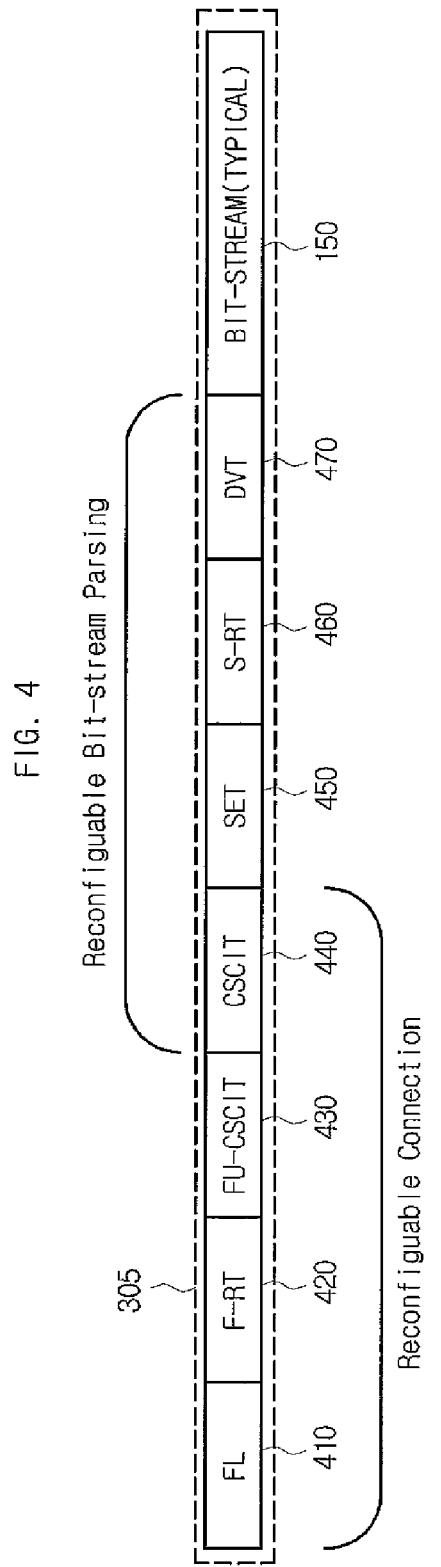
FIG. 4 is a simplified block diagram illustrating the structure of a universal bit-stream in accordance with an embodiment of the present invention.
Figure 5:
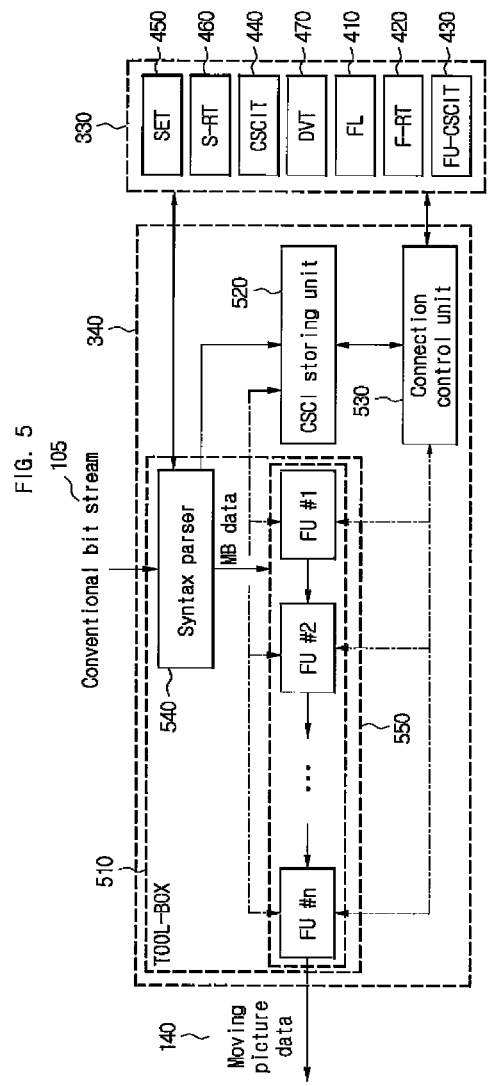
FIG. 5 is a simplified block diagram illustrating the structure of a codec unit in accordance with an embodiment of the present invention.
Figure 6:
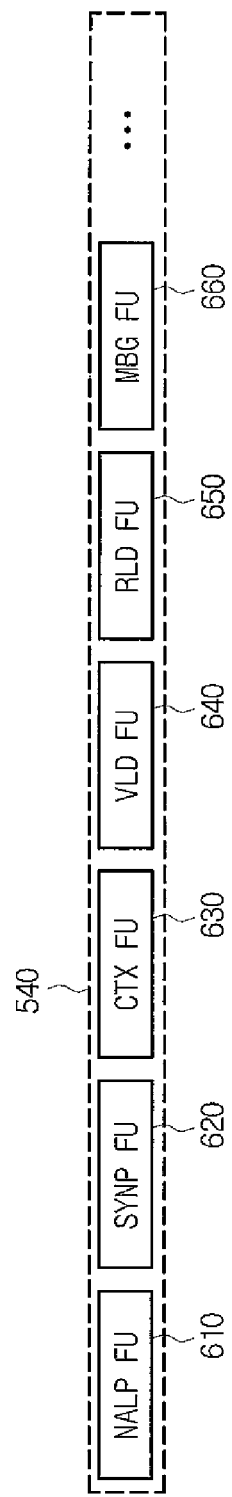
FIG. 6 is a simplified block diagram illustrating the structure of a syntax parser in accordance with an embodiment of the present invention.
Figure 7:
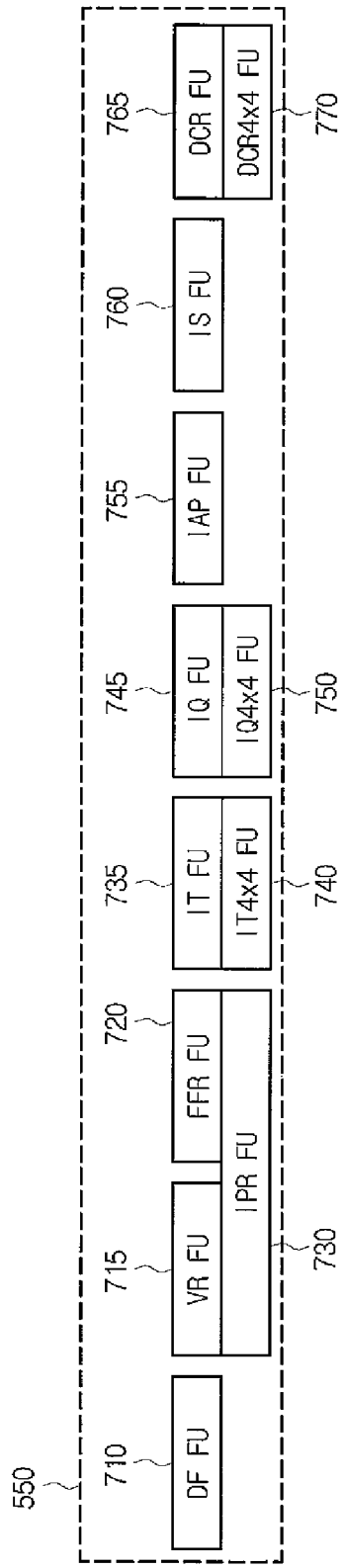
FIG. 7 is a simplified block diagram illustrating the structure of an MB processing unit in accordance with an embodiment of the present invention.

Each element included in the encoder 200 performs the inverse functions of the corresponding elements of the encoder 100. This is well-known to those of ordinary skill in the art. Briefly describing, the encoder 200 converts a moving picture signal (i.e. a digital video pixel value) to a frequency value through the DCT and the quantization and performs the encoding of the frequency value. Then, the encoder 200 performs variable length encoding of the frequency value and outputs the frequency value in a compressed bit stream form, the variable length encoding differentiating bit length according to the frequency number of information FIG. 3 is a simplified block diagram illustrating the structure of a decoder in accordance with an embodiment of the present invention, and FIG. 4 is a simplified block diagram illustrating the structure of a universal bit-stream in accordance with an embodiment of the present invention. FIG. 5 is a simplified block diagram illustrating the structure of a codec unit in accordance with an embodiment of the present invention. FIG. 6 is a simplified block diagram illustrating the structure of a syntax parser in accordance with an embodiment of the present invention. FIG. 7 is a simplified block diagram illustrating the structure of an MB processing unit in accordance with an embodiment of the present invention As illustrated FIG. 3, the decoder 300 of the present invention has a different structure from the conventional decoder (refer to FIG. 1).

In other words, the decoder 300 in accordance with the embodiment of the present invention includes a dividing unit 310, a decoding description decoder (DDD) 320, a table storing unit 330 and a codec unit 340. It shall be obvious that at least one of the illustrated elements (e.g. the dividing unit 310, the DDD 320 and the codec unit 340) can be realized as a software program (or the combination of program codes) embodied for performing a function to be described below.

The dividing unit 310, which divides an inputted universal bit-stream 305 into a decoding description (DD) part and a typical bit-stream (hereinafter, referred to as a conventional bit-stream) part, inputs the decoding description by using the DDD 320 and the conventional bit-stream) by using the codec unit 340.

In other words, the universal bit-stream of the present invention, as illustrated in FIG. 4, can include the decoding descriptions 410 through 470 and the conventional bit-stream.

The decoding description is related to the structure information and encoding method (or the connection between functional units) of the conventional bit-stream 105, in order to parse a bit-stream, encoded by various encoding methods and/or by a function selected by a user among diverse functions by a common analyzing method.

It is obvious that the decoding description can be included in the universal bit-stream 305 and transferred to the decoder 300 (referring to FIG. 4 and FIG. 9 through FIG. 12) or be provided in a form of independent bit-stream or data to the decoder 300. The decoding description can be described by using a description method such as textual description or binary description.

The decoding description can include a functional unit list (FL) 410, a functional unit rule table (F-RT) 420, a functional unit CSCIT (FU-CSCIT) 430, a control signal and context information table (CSCIT) 440, a syntax element table (SET) 450, a syntax-rule table (S-RT) 460 and a default value table (DVT) 470. It is obvious that the order of each table for forming the decoding description information can be variously changeable.

Here, the FL 410, the F-RT 420, the FU-CSCIT 430 and the CSCIT 440 can be used in order to set the connection of each functional unit (the corresponding table can be referred to as a 'a first decoding description').

Among them, the FU-CSCIT 440 can be the decoding description information for the mapping between each functional unit in an MB processing unit 550 and element information stored in a CSCI storing unit 520. In this case, the element information can function as a control variable for each functional unit in the MB processing unit 550 and/or a syntax parser 540.

Beside that, the CSCIT 440, SET 450, the S-RT 460 and the DVT 470 can be used for the parsing of the conventional bit-stream 105 (the corresponding table can be referred to as a 'second decoding description'). The structure and function of each decoding description information will be described below in detail.

The DDD 320 converts the decoding description, inputted from the dividing unit, into a plurality of tables in a form of being recognizable by codec unit 340 and stores the tables in the table storing unit 330. In other words, the DDD 320 converts the data, in a form of binary data, included in the universal bit-stream into the tables capable of being analyzed by the syntax parser 540 and stores the tables in the table storing unit 330.

Figure 10:
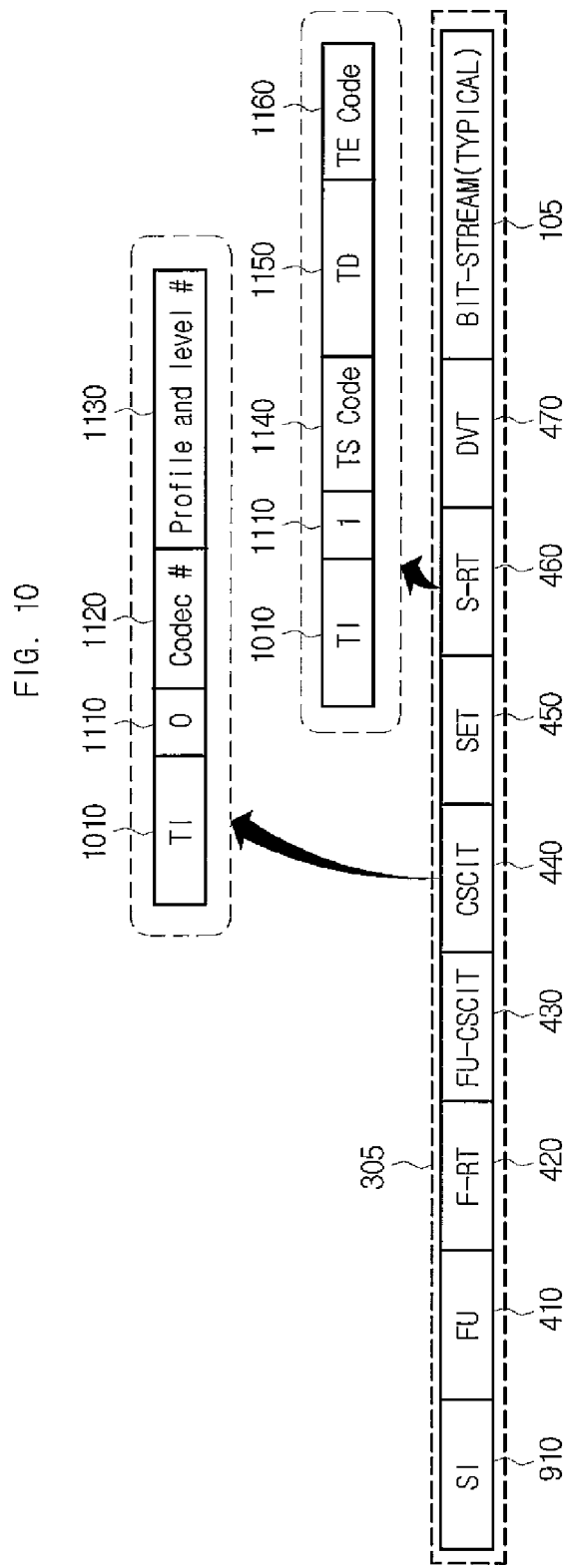
FIG. 10 illustrates the structure of a universal bit-stream in accordance with a third embodiment of the present invention.

The tables stored in the table storing unit 330 by the decoding description analysis of the DDD 320 can include the FL 410, the F-RT 420, the FU-CSCIT 430, CSCIT 440, the SET 450, the S-RT 460 and the DVT 470. The DDD 320, as illustrated in FIG. 10, can identify each table by referring to a table identifier (IT) 1010.

Figure 8:
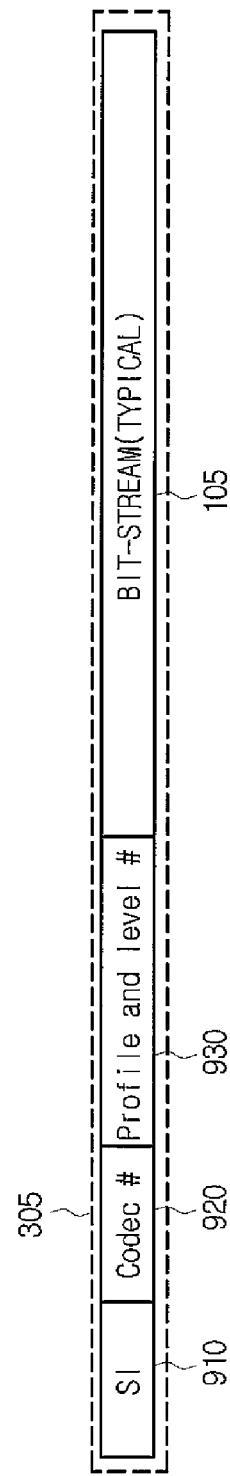
FIG. 8 illustrates the structure of a universal bit-stream in accordance with a first embodiment of the present invention.

Of course, it is not necessary that all tables must be stored in the decoding description. As illustrated in FIG. 8, the decoding description can include a codec number (codec #) 920. Alternatively, as illustrated in FIG. 10, only some tables of the decoding description can include a codec number 1120 and a profile and level number 1130. In the case of including the codec number and the profile and level number, the DDD 320 can generate no new table for overall tables or some tables and select a corresponding table of the pre-stored tables so as to be used when decoding.

Of course, in the case of including the codec number and the profile and level number and changing information, the DDD 320 can extract a table corresponding to the pertinent codec from the pre-stored tables and apply the changing information to the selected table to generate a new table. In the meantime, in the case of including no codec number and no profile and level number but including the table description for generating a table, the DDD 320 can generate a new table for the overall tables or some tables so as to be used when decoding.

Figure 11:
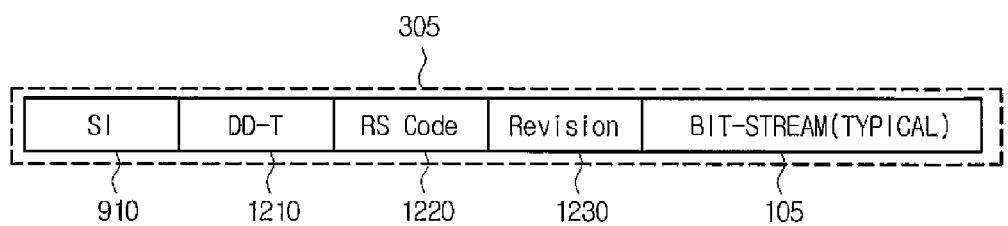
FIG. 11 illustrates the structure of a universal bit-stream in accordance with a forth embodiment of the present invention.

Beside that, the decoding description, as illustrated in FIG. 11, can further include not only a decoding description for each table (DD-T) 1210 but also revision information 1230. The structure of each universal bit-stream will be described in detail below with referent to the pertinent drawings.

The table storing unit 330 stores each table divided by the DDD 320. Of course, in case that the universal bit-stream 305 includes the codec number 920 or 1120 and the profile and level number 930 or 1130, at least one table can be stored in advance so as to be used by the codec unit 340.

The codec 340, as illustrated in FIG. 5, can include a toolbox 510, a control signal/context information (CSCI) storing unit 520 and a connection control unit 530.

The toolbox 510 includes the syntax parser 540 and a plurality of functional units (FU). It shall be obvious that the syntax parser 540 can be embodied as a functional unit. The syntax parser 540 and functional units, respectively, can be realized as the combination of program codes.

In other words, the toolbox 510 is the part included with functional units realized to perform each function. Each functional unit, which is formed in the successive connection according to the connection control of the connection control unit 530, outputs encoded video data, included in the conventional bit-stream 105, as moving picture data. However, the syntax parser 540 included in the toolbox can be set to perform the analysis of the conventional bit-stream 105 without the connection control of the connection control unit 530. This is because the following functional units can use the element information, analyzed and stored in the CSCI storing unit 520 by the syntax parser 540, and/or the moving picture having a macro block size, outputted from the syntax parser 540.

The syntax parser 540 analyzes an inputted conventional bit-stream 105 by using the SET 450, the S-RT 460, the CSCIT 440 and the DVT 470 and stores element information, which is the result of the syntax parsing, in the CSCI storing unit 520. For example, the CSCI storing unit 520 can be a buffer memory, and the element information can be control signal/context information (CSCI). The element information, parsed by the syntax parser 540 and stored in the CSCI storing unit 520, can be a parsing result value of the corresponding step and simultaneously an input value determining the following syntax of the conventional bit-stream.

The syntax parser 540 also performs the entropy decoding of the header of the syntax-parsed conventional bit-stream 105 and video data and outputs moving picture data having a predetermined macro block size to the following functional unit according to the connection control of the connection control unit 530.

Of course, the syntax parser 540 can store the moving picture data having the macro block size in the predetermined buffer memory, and the following functional unit can read and process the moving picture data having the macro block size in the corresponding buffer memory, and then, the processed moving picture data can be stored in the corresponding buffer memory for the processing of the following functional unit. In other words, it shall be obvious that the syntax parser 540 can store the moving picture data having the macro block size in the CSCI storing unit 520 or in an additional buffer memory, and then, the connection control unit 530 can provide the stored moving picture data having the macro block to a selected functional unit, or the selected functional unit can read the pertinent moving picture data from the CSCI storing unit 520 or the additional buffer memory. However, the below description assumes that the moving picture data having the macro block size, outputted by the syntax parser 540, is inputted into the functional unit according to the connection control of the connection control unit 530.

The syntax parser 540 can be realized as a software program (the combination of program codes). This is because although the syntax parser 540 is embodied to perform a plurality of functions corresponding to a plurality of standards (e.g. MPEG-1/2/3/ABC), respectively, the corresponding operation can be carried out by using the SET 450, the S-RT 460, the CSCIT 440 and the DVD 470. Alternatively, it is obvious that the syntax parser 540, as illustrated in FIG. 6, can be realized by dividing it into a plurality of functional units or realized as the combination of program codes blocked with each functional unit.

Below is described the function of the syntax parser 540 by explaining each functional exampled in FIG. 6 in detail.

As exampled in FIG. 6, the syntax parser 540 can includes a network abstraction layer parsing (NALP) FU 610, a syntax parsing (SYNP) FU 620, a context determination (CTX) FU 630, a variable length decoding (VLD) FU 640, a run length decoding (RLD) FU 650 and a macro block generator (MGB) FU 660.

Of course, the syntax parser 540 can include any functional unit for the syntax parsing regardless of the applied standard. Beside that, it is shall be obvious that the functional unit necessary for the syntax parsing in the technology developing operation can newly be added, the existing functional unit can be changed and the unnecessary functional unit can be removed. It is also obvious that each functional unit equipped in the syntax parser 540 can be as one functional unit in case that the functional units is not independently provided and is able to be identically processed regardless of the corresponding standards. Since the function of each functional unit is well-known to those of ordinary skill in the art, the function will be briefly described below.

The NALP FU 610 parses the network abstraction layer of the MPEG-4 AVC, and the SYNP FU 620 parses the syntax of a bit-stream. The SYNP FU 620 can be included in the VLD FU 640.

The CTX FU 630 determines a VLC table of the MPEG-4 AVC, and the VLD FU 640 performs the entropy decoding.

The RLD FU 650 performs the entropy decoding of AC values, and the MBG FU 660 couples DC values and AC values to generate one macro block datum. The overall or some functional units can be included in the VLD FU 640 according to a system realizing method.

As described above, the syntax parser 540 can be realized as a software program or a plurality of software programs (e.g. the VLD FU 640 can be independently realized as a separate software program). The operation, which the syntax parser 540 extracts or generates element information by using first description information (e.g. at least one of the SET 450, the S-RT 460, the DVT 470 and the CSCIT 440) and stores the extracted or generated element information in the CSCIT storing unit 520, will be described in detail in the description related to the connection control unit 530.

The MB processing unit 550 decodes moving picture data in macro block units, inputted from the syntax parser 540 (or stored in a buffer memory by the syntax parser 540) and outputs it as moving picture data having a predetermined size.

The MB processing unit 550 can include a functional unit for performing the aforementioned fraction corresponding to each standard. Each of functional units can be embodied as an independent processing block (e.g. a software program, the combination of command codes and a function) to form the MB processing unit 550. Alternatively, the MB processing unit 550 can be realized as one unified processing block. It shall be obvious that the MB processing unit 550 can perform the identical processing according to the connection control of the connection control unit 530 in spite of being realized as one unified processing block.

The MB processing unit 550, as illustrated in FIG. 7, includes a de-blocking filter (DF) FU 710, a VOP reconstructor (VR) FU 715, a frame field reordering (FFR) FU 720, an intra prediction and picture reconstruction (IPR) FU 730, an inverse transform (IT) FU 735, an inverse quantization (IQ) FU 745, an inverse AC prediction (LAP) 755, an inverse scan (IS) FU 760 and a DC reconstruction FU 765.

An IT4×4 FU 740, an IQ4×4 FU 750 and the DCR4×4 FU 770 process a block having a 4×4 size. This is because data having an 8×8 block size is processed in the transform, quantization and prediction in the case of MPEG-1/2/4, while there is a case that data having a 4×4 block size are processed in the case of MPEG-4 AVC.

The MB processing unit 550 can include any functional unit for the syntax parsing regardless of the applied standard. Beside that, it is shall be obvious that the functional unit necessary for the syntax parsing in the technology developing operation can newly be added, the existing functional unit can be changed and the unnecessary functional unit can be removed. For example, in the case of additionally requesting the IS4×4 FU processing the data having the 4×4 block size for decoding processing, the pertinent functional units can be added to the MB processing unit 550. Alternatively, a special prediction (SPR) FU (not shown) for performing the intra prediction in MPEG-4 AVC can be added.

It is also obvious that each functional unit equipped in the MB processing unit 550 can be as one functional unit in case that the functional units is not independently provided and is able to be identically processed regardless of the corresponding standards. Since the function of each functional unit is well-known to those of ordinary skill in the art, the function will be briefly described below.

The DF FU 710 is the de-blocking filter of MPEG-4 AVC, and the VR FU 715 stores a recovered pixel value.

The FFR FU 720 is the functional unit for an interlaced mode, and the IPR FU 730 performs the intra prediction of MPEG-4 AVC, and then, stores the recovered pixel value. As described above, the intra prediction of MPEG-4 AVC can be performed by the SPR functional unit.

The IT FU 735 performs the inverse transform of the DC values and AC values, and the IQ FU 745 performs the inverse quantization of the AC values.

The IAP FU 755 performs the inverse AC prediction of the AC values, and the IS FU 760 performs the inverse scan of the AC values. The DCR FU 765 performs the inverse prediction and the quantization of the DC values.

It is not necessary that each operation of the aforementioned syntax parser 540 and MB processing unit 550 must be successively performed (i.e. the NM processing unit starts to function after the syntax parser completes to function). It is also obvious that each operation of the aforementioned syntax parser 540 and MB processing unit can be performed in parallel. This is because it can be sufficient that only minimum element information necessary for the operation of the functional unit currently operated by the MB processing unit 550 is stored in the CSCI storing unit 520, for example.

The CSCI storing unit 520 stores element information (e.g. CSCI), which is the result value by the syntax parsing by using the SET 450 and the S-RT 460 in the syntax parser 540 so as to correspond to the CSCIT 440. For example, the CSCI storing unit 520 can be a buffer memory.

The element information, stored in the CSCI storing unit 520, can be used as input data for performing the process of the SET 450 by the syntax parser 450 or as a control variable for determining the following connection index in the S-RT 460.

The element information, stored in the CSCI storing unit 520, can be also used as a control variable for determining the following connection index in the F-RT 420 by the connection control unit 530 or can be used for mapping the input CSCI of a specific functional unit to the element information, stored in the CSCI storing unit 520, in the FU-CSCIT 430.

In other words, the element information, stored in the CSCI storing unit 520, allows the syntax parser 540 and the MB processing unit 550 to be linked to each other.

The connection control unit 530 sets the connection of each functional unit included in the MB processing unit 550 to decode a bit-stream encoded by various standards. In other words, the connection control unit 530 selects necessary functional units among each functional unit included in the MB processing unit 550 and determines the performing order of the selected functional units. For this, the connection control unit 530 connects the pertinent functional units by using the FL 410, F-RT 420 and the CSCIT 440 and allows each functional unit to decode moving picture data in macro block units by using the element information provided by the syntax parser 540.

The connection control unit 530 uses the FL 410, the F-RT 420, the FU-CSCIT 430 and the CSCIT 440 to perform the aforementioned function.

First, the FL 410, as illustrated in FIG. 17, is the table including the list of each functional unit, equipped in the MB processing unit 550, input and output data of the pertinent functional units and element information controlling the functional units.

The FL 410 can further include a buffer memory title of input data for each functional unit (or a history address of the corresponding data or an address of the buffer memory, written with the pertinent data) and a buffer memory title of output data for the pertinent data (or a history address of the corresponding data or an address of the buffer memory, to be written with the pertinent data).

Accordingly, each functional list can read input data and write processed output data, by using the FL 410. Alternatively, the input and output data can be transferred between each functional unit, or the connection control unit 530 can provide appropriate input data to each functional unit.

However, the input data and output data of the syntax parser 540 generating element information is not written in the FL 410. This is because the syntax parser 540 generates the element information by using the SET 450 and writes the generated element information in a predetermined area.

The FL 410, as illustrated in FIG. 17, can include an identifier (index) for identifying each functional unit, a name of each functional unit (FU name), the number of input control (CSCI) variable necessary for the corresponding functional unit, input data and output data.

A specific functional unit, selected by the connection control unit 530, receives input data from the connection control unit 530 and performs a predetermined process, to generate output data. Here, the functional unit refers to a series of processing operation (e.g. a task, algorithm or function) included in the MB processing unit 550 and performing the processing of the input data by using a predetermined process, to generate the output data. The pertinent functional unit can store the output data in the buffer memory to process the following functional unit (i.e. the functional unit followed and selected by the connection control unit). Since the functional unit exampled in FIG. 17 has already been described in the description related to the MB processing unit 550, the pertinent description will be omitted. Also, a QFS, a QFSP, a PQF and a QF in FIG. 17 are well-known to those of ordinary skill in the MPEG field, the corresponding description will be omitted. For example, the QFS refers to an output value performed with variable length coding.

In case it is sufficient that the codec unit 340 uses one standard to decode encoded video data included in the conventional bit-stream 105, the FL 410 can include only information related to the functional units for performing the processing corresponding to the pertinent standard.

However, in the case of encoding the corresponding video data by a plurality of standards (e.g. in the case of applying the encoding standard depending on a plurality of flame units), there is requested the information related to the functional units according to the plurality of standards to decode the corresponding encoded video data. Accordingly, in this case, the FL 410 must include the information related to the functional units according to the plurality of standards, necessary for the decoding of the encoded video data, among all functional units according to the corresponding plural standards.

Of course, although the video data is differently applied with the encoding standard per plurality of frame unit, if a plurality of the conventional bit-stream 105 and the universal bit-stream 305 are generated and outputted per applied encoded standard, it is sufficient that each FL 410 includes the information related to the functional units according to corresponding standards, respectively.

The FL 410 can be described by a describing method such as textual description and binary description (a form of a bit-converted binary code). Beside that, minimum necessary data in the table can be described in similar script languages.

Next, the F-RT 420 provides the connection rule of the functional units to be used for the decoding of the inputted conventional bit-stream 105.

The F-RT 420, as shown FIG. 18, includes an index (R) identifying each connection rule, a functional unit (F) corresponding to the pertinent connection index, element information (input CS/CI, C) necessary for the connection control, the number of branches (No. of branches) capable of being connected to the following functional unit, and branch information (#1, #2, and #3) necessary as many as the branch number.

There is provided the necessary element information in case that the number of branches is 2 or more. In this case, the connection index can be varied depending on the determining result of conditional sentence using the necessary element information. In other words, if the number of branches is 1, there is no necessary element information, and the connection index, indicated by the branch information, progresses. The following connection index (R) is represented after the pertinent conditional sentence.

In case it is sufficient that the codec unit 340 uses one standard to decode encoded video data included in the conventional bit-stream 105, the F-RT 420 will indicate the connection of the functional units for performing the processing corresponding to the pertinent standard.

However, in the case of encoding the corresponding video data by a plurality of standards (e.g. in the case of applying the encoding standard depending on a plurality of frame units), it is obvious that the F-RT 420 includes the information for indicating the connection of the functional units according to the plurality of standards to decode the corresponding encoded video data. Accordingly, it is obvious that each table, described below, further includes the pertinent information if the tables request additional information and/or need to be changed so as to be applied to the plurality of standards.

The F-RT 420 can be described by a describing method such as textual description and binary description (a form of a bit-converted binary code). Beside that, minimum necessary data in the table can be described in similar script languages.

As exampled in FIG. 18, the functional unit for performing R0 through R5 and R12 is F0 among the index (R) identifying each connection rule. The F0, referring to the FL 410 of FIG. 17, is the syntax parser 540. Accordingly, the connection control 530 controls the connection of the operation of each functional unit (including the syntax parser 540) equipped in the toolbox 510. Also, in case that the selected functional unit is the syntax parser 540, the F-RT 420 includes the connection rule indicating that the syntax parser 540 has to read and process $n^{th}$ syntax (e.g. F0 (R74)).

Beside that, the index R1 is defined with 'PROCESS1' on the item of the functional unit. For example, 'PROCESS1' can be the function called to perform other operations (i.e. operations excluding syntax parsing and data decoding) necessary for programming a software such as variable declaration, memory setting and variable initialization. This kind of the process can be inserted into the necessary location of the F-RT 420 and called by the connection control unit 530 in the syntax parsing operation or in the middle of the data decoding operation, so as to be performed. Even though FIG. 18 illustrates that one process is inserted, it shall be obvious that a plurality of processes having all identical performing operations or performing operations different from each other can be inserted into a plurality of locations of the F-RT 420.

Next, the FU-CSCIT 430 refers to the table for connecting the element information, stored in the CSCI storing unit, to the element information (input CSCI) necessary for each functional unit.

As illustrated in FIG. 19, the FU-CSCIT 430 includes an index (F-C) arranged as a pair of the index and the element information of the FL 410, corresponding element information and an index (C) used in the CSCIT 440 for the mapping. Beside that, the FU-CSCIT 430 can further include a data type of the element information. For example, the data type can be described in a form of 9-bit integer or 1-bit flag.

The FU-CSCIT 430 can be described by a describing method such as textual description and binary description (a form of a bit-converted binary code). Beside that, minimum necessary data in the table can be described in similar script languages.

For example, if F1 receives 4 items of element information from the F-RT 420 (refer to FIG. 17), the FU-CSCIT 430 is listed with the element per functional unit. In other words, F1-C1, F1-C2, F1-C3 and F1-C4 are listed, and each element information such as C54, C56, C58 and C65 is mapped to by using the index (C) of the CSCIT 440 (refer to FIG. 20).

Similarly, if F2 receives 2 items of the element information, the FU-CSCIT 430 indexes F2-C1 and F2-C2, and C56 and C 58 are mapped to. Here, the C56 and C 58 can be recognized as the addresses stored with the corresponding element information (e.g. a history address, a buffer memory title and a history address of a buffer memory), respectively. The pertinent functional unit can generate output data by using the element information corresponding to the input data and index (C) and output (or write in the buffer memory) the generated output data.

For example, the DCR requests 4 items of element information to process input data of QFS in the FL 410, and the 4 items of element information is recognized as C54, C56, C58 and C65 by the FU-CSCIT 430. The CSCIT storing unit 520 reads the element information corresponding to the pertinent index (C) to generate QFSP.

Finally, the CSCIT 440 is described with the detailed element information (e.g. CSCI), that is, the result information of the process where the syntax parser 540 use the SET 450 and the S-RT 460. In other words, the CSCIT 440 includes all meaningful data (i.e. element information), which is processed from the conventional bit-stream 105, stored in the CSCI storing unit 520 and to be used by the MB processing unit 550.

As illustrated in FIG. 20, the CSCIT 440 includes an index (C), which is an identifier as an identity number of the pertinent information, a flag, a name (element name) of the pertinent element information, an attitude (e.g. a storing space size of the pertinent element information and whether the pertinent element information is an array type) indicating data-structural property of the pertinent element information and a global/local indicating whether the pertinent element information is used in the syntax parsing operation or overall decoding operation.

The CSCIT 440 can be described by a describing method such as textual description and binary description (a form of a bit-converted binary code). Beside that, minimum necessary data in the table can be described in similar script languages.

Next, the CSCIT 440, the SET 450, S-RT 460 and the DVT 470, which are used in order to extract or generate the element information from the conventional bit-stream 105 and store the extracted or generated element information in the CSCI storing unit 520, will be described. However, since the CSCIT 440 has already been described with reference to FIG. 20, the pertinent description will be omitted.

First, the SET 450 refers to the table formed by the information related to the syntaxes of the inputted conventional bit-stream.

As illustrated in FIG. 21 through FIG. 24, the SET 450 includes an index of each syntax, an element name, input data, output data, and SET-process (process by SET-PROC) information. Here, the index is the identifier (S) identifying each syntax used in the S-RT 460. The element name can be named for the syntax depending on the meaning or function of the syntax. The input data refers to nominal bit length of data inputted at one time in the conventional bit stream 150. The output data indicates a list of the CSCIT 430 referred to when storing acquired data, as the element information (i.e. CSCI (C)). Here, an output data field can be the title of a buffer memory (or a history address of the corresponding data or an address of the buffer memory, written with the pertinent data) where the generated element information will be written. For this, in the case of requesting the element information as input data later, the pertinent element information can be read by using the CSCI (C). The SET-process describes the operating process, undergone after the operation receiving the syntax of each bit-stream, and generating the element information as output data.

The SET 450 can be described by a describing method such as textual description and binary description (a form of a bit-converted binary code). Beside that, minimum necessary data in the table can be described in similar script languages.

Then, the S-RT refers to the connection rule between each syntax in the conventional bit-stream. In other words, the S-RT 460 includes the information calling each syntax and directing to move to the next syntax. The syntax parser 540 reads the conventional bit-stream 105 or defines the order of storing in the CSCI storing unit 520 and/or renewing the element information.

As exampled in FIG. 25 through FIG. 28, the S-RT 460 includes an index (R), an index (S) of the syntax, input data (C), the number of branches and branch information.

The index (R) identifies each connection rule. Since the index (S) of the syntax designates the syntax to be processed in a specific connection index, the syntax parser 540 performs the predetermined process of the pertinent syntax by using the SET 450.

The input data indicates the list of the element information to be used for the conditional determination for the connection control of the pertinent connection index.

The number of branches, which is the number of cases capable of being connectable to the following syntax, indicates the total number of branch paths included in the pertinent connection index. The branch information (#1, #2, #3 . . . ), which is provided necessary as much as the number of branches, refers to the conditional determining algorithm to determine which connection index is processed next. It can be directly determined what content is read and in which order the content is read. As illustrated in FIG. 25 through FIG. 28, if the number of branches is 1, there is no input data, it directly progress to process the connection index designated by the branch information. However, in case that the number of branches is 22 or more, the condition determination is performed (it is formed by next connection rule (R) after conditional sentence), and it progresses to process the corresponding connection index.

The syntax parser 540 processes the syntax defined in the pertinent connection index and renews the CSCI storing unit 520. Then, the syntax parser 540 refers to and reads the element information of the renewed CSCI storing unit 520 and uses the element information for the branch conditional determination. For example, C0 in 'C0=1' as the branch condition of the branch information of the index R0 is the element information C0 after processing the syntax S0.

The S-RT 460 can be described by a describing method such as textual description and binary description (a form of a bit-converted binary code). Beside that, minimum necessary data in the table can be described in similar script languages.

Finally, the DVT 470 is the table written with Huffman table information used in each encoder/decoder. In MPEG-1/2/4/AVC, the entropy coding is performed whenever encoding, by mainly using the Huffman coding method. In this case, the used information is the Huffman table. There must be provided the Huffman table information to be used in the pertinent decoder whenever decoding, in order to realize unified codec. Accordingly, the Huffman table information corresponding to each syntax in the decoding description of the present invention is included, when syntax parsing. Of course, in case that the Huffman table information corresponding to each standard has already been written in the table storing unit 330, the transmission of the DVT 470 will be omitted or only the codec number 1120 and the profile and level number 1130 can be included as illustrated in FIG. 11.

As illustrated in FIG. 29 through FIG. 30, the DVT 470 includes a name of each Huffman table, an actual value compressed by the Huffman coding and outputted and a code value when the compressed actual value is stored in the conventional bit-stream 105. For example, in case that the compression of an MCBPC value leads to the actual value of 3, the code value of 011 is written in the conventional bit-stream by a Huffman table mapping operation (e.g. the PROCESS of the SET 450). For another example, VLD[1] is written in the PROCESS of the index S77 (refer to FIG. 21 through FIG. 24) of the SET 450, exampled above, to call a VLD function. The code value is obtained by reading the conventional bit-stream 105 as much as the length (fixed length or variable length) predetermined by this function. Then, the corresponding actual value can be obtained by the Huffman table mapping operation. At this time, the Huffman table is [1], that is, $1^{st}$ table of CBPY.

The DVT 470 can be described by a describing method such as textual description and binary description (a form of a bit-converted binary code). Beside that, minimum necessary data in the table can be described in similar script languages.

For example, the DVT 470 can be described in textual description as follows.

DVT{((0,1), (1,001), (2,010), (3,011), (4,0001), (5,000001), (6,000010), (7,000011), (8,000000001), (9,NULL)) ((0,0011), (1,00101), (2,00100), (3,1001), (4,00011), (5,0111), (6,000010), (7,1011), (8,00010), (9,000011), (10,0101), (11,1010), (12,0100), (13,1000), (14, 0110), (15,11), (16,000000), (17,000001), (18,NULL)) ((0, 011), (1,11), (2,10), (3,010), (4,001), (5,0001), (6,00001), (7,000001), (8,0000001), (9,00000001), (10,000000001), (11,0000000001), (12,00000000001), (13,NULL)) ((0,11), (1,10), (2,01), (3,001), (4,0001), (5,00001), (6,000001), (7,0000001), (8,00000001), (9,000000001), (10,0000000001), (11,00000000001), (12,000000000001), (13,NULL)).

Alternatively, the DVT 470 can be described in binary description as follows.

000000111111111111111111111111101111100001100
011001000110100001101100011001010010100100010
000100100100101000110010001110011000001000001001
0110010100010001100000110010001010010010100001000
100001001000001000110000101100110000000000110000
001000001111100011011000101100010100001101000001
1001001000001001010000100110000001001110000010
100000000001010010000000010101000000000001010110
0000000001000001111100010110001010001001000
110010010000010010100001001100000010

Each table can be described in binary description, to thereby reduce the storing space, increase the processing efficiency and decrease the transmission time of the universal bit-stream included in the decoding description. For example, the below table 1 shows the overhead bit of the textual description and the binary description for each table based on MPEG-4 SP (simple profile).

TABLE 1

Overhead of Textual/Binary Description (bytes)

| Table name | Textual Description | Binary Description |
|---|---|---|
| SET | 3,653 | 1,089 |
| S-RT | 4,201 | 1,122 |
| F-RT | 466 | 142 |
| CSCIT | 808 | 24 |
| FU-CSCIT | 151 | 37 |
| FL | 98 | 28 |
| DVT | 2,599 | 259 |
| Total | 11,976 | 2,702 |

Hereinafter, the linking operation between each table used by the syntax parser 540 and/or the connection control unit 530.

The codec unit 340 of the decoder 300 in accordance with the present invention can start to be variably operated. Some of the operating methods are described below.

In a method according to a first embodiment, once the syntax parser 540 independently starts to be operated (i.e. starts the syntax parsing of the conventional bit-stream by using the tables stored in the table storing unit 330) and completes the syntax parsing of the conventional bit-stream, the connection control unit 530 controls the connection of each functional unit of the MB processing unit 550 by using tables stored in the table storing unit 530.

In this case, the syntax parser 540 first has to recognize the completion of storing the tables necessary for the table storing unit 530. For this, the syntax parser 540 must sustainably monitor whether to store table information in the table storing unit 330, or the DDD 320, which has completed to store the table information, must notify it to the syntax parser 540.

Beside that, the connection control unit 530 first has to recognize whether the syntax parser 540 stores some/overall necessary element information in the CSCI storing unit 520. For this, the connection control unit 530 must sustainably monitor whether to store the necessary element information in the CSCI storing unit 520, or the syntax parser 540, which has stored the element information, must notify it to the connection control unit 530 (e.g. the control authority such as an index R72 of the S-RT 460 must be returned to the connection control unit 530). Of course, it shall be obvious that the connection control unit 530 (or a functional unit selected by the connection control unit 530) and/or the syntax parser 540 can be on standby after starting to be operate until necessary information is stored in the pertinent storing unit, without monitoring whether to store the necessary information in the table storing unit 330 or the CSCI storing unit 520.

In another method according to a second embodiment, the connection control unit 530 can control the connection of each functional unit of the syntax parser 540 and the MB processing unit 550 by using the tables stored in the table storing unit 330. As described in the example related to the F-RT 420, after first directing to start the operation of the syntax parser 540 such that the element information syntax-parsed with the conventional bit-stream can be stored in the CSCI storing unit 520, if the control authority is returned to the connection control unit 530 (e.g. the control authority such as an index R72 of the S-RT 460 is allow to be returned to the connection control unit 530), the connection of each functional unit is controlled such that the corresponding functional unit can process the following operation.

In this case, the connection control unit 530 first has to recognize that the storing of the tables necessary for the table storing unit 330 is completed. For this, the connection control unit 530 must sustainably monitor whether to store the table information in table storing unit 530, or the DDD 320, which has completed the storing of the table information, must notify it to the connection control unit. Of course, it shall be obvious that the connection control unit 530 (or a functional unit selected by the connection control unit 530) and/or the syntax parser 540 can be on standby after starting to be operate until necessary information is stored in the pertinent storing unit, without monitoring whether to store the necessary information in the table storing unit 330 or the CSCI storing unit 520.

In another method according to a third embodiment, a trigger can be realized to direct to start the operation of the connection control unit 530 and/or the syntax parser 540. In the case of receiving the universal bit-stream 305, the trigger first recognize it and directs to start the operation of the dividing unit 310. Then, if the plurality of tables corresponding to the decoding description is completed to be stored in the table storing unit 330, the trigger can recognize it and direct to start the operation of the codec unit (i.e. the connection control unit 530 and/or the syntax parser 540). The realizing of the bigger makes it unnecessary for the connection control unit 530 and/or the syntax parser 540 to monitor the table storing unit 330, for example, in order to determine when to start to be operated in each aforementioned embodiments.

Below is described the liking operation between each table used by the connection control unit 530 and/or the syntax parser 540 based on the aforementioned second embodiment.

First, the connection control unit 530 reads a first regulation rule of the F-RT 420 in the table storing unit 330, to call the pertinent functional unit. As shown in the F-RT 420, the connection control unit 530 reads F0(R0) firstly, and then, directs to the syntax parser 540 to process it. This can be to activate a processing block of the program codes corresponding to the syntax parser 540. In the case of the FL 410, F0 can be identified as the syntax parser 540. If the selected functional unit is the syntax parser 450, the information (e.g. F0(R0) and F0(R114)) that $n^{th}$ syntax must be read is described together.

The syntax parser 540 reads a regulation rule, designated by the connection control unit 530 (i.e. designated by the F-RT 420), of the regulation rules of the S-RT 460, to read the pertinent syntax. As described above, since the regulation designated by the F-RT 420 is F0(R0), the syntax parser 540 starts to process from the index R0. The syntax parser 540 recognizes that the S0 must be processed in the index of R0 by the S-RT 460 and that the S0 is the visual object sequence start code by the SET 450. Then, the syntax parser 540 reads the corresponding bit (i.e. 32 bit set as the input value for the SET 450) from the conventional bit-stream 105 and generates the corresponding output (i.e. C0 as the element information) to store it in the CSCI storing unit 520. The CSCIT 440 is described with what is the pertinent element information, stored in the CSCI storing unit 520.

Next, the syntax parser 540 substitutes the element information (i.e. C0), stored in the CSCI storing unit 520, for branch information corresponding to the S-RT 460 and progresses the index processing corresponding to the result. For example, since the branch information corresponding to the index of R0 is 'C0==1,' if it is satisfied, R1 progresses. Otherwise, it is processed as an error. This operation is repeated until there is 'GO RT' and the control authority is transferred to the F-RT 420 (i.e. connection control unit 530) (e.g. index of R72 of the S-RT 460).

However, if the VLD function (e.g. index of S74 of the SET 450) is called in the operation that the syntax parser 540 generates element information by using the SET 450 and stores the generated element information in the CSCI storing unit 520, the entropy decoding is performed by using the DVT 470. In this operation, if the element information is generated, the generated element information is stored in the CSCI storing unit 520.

If there is 'GO RT' in the processing operation of the syntax parser 540 and the control authority is transferred to the F-RT 420 (i.e. connection control unit 530) (e.g. index of R72 of the S-RT 460), the connection control unit 530 reads C 64, that is, the input value of the index of R0 (i.e. element information according to the index of S57 of the SET 450 in the syntax parsing operation) from the CSCI storing unit 520 and designates a next index to be processed by substituting it for branch information (i.e. ((C63==1)||(C63==2)) or ((C63==3)||(C63==4))). In other words, it is determined in accordance with whether it satisfies the branch information that the index of R1 progresses, it is ended or it is processed as an error.

If the R1 progresses, a predetermined processing (e.g. variable declaration, memory setting and variable initialization) is performed, and then, the next index to be processed is determined.

As described above, if some/overall element information is stored in the CSCI storing unit 520 by the processing of the syntax parser 540, the connection control unit 530 calls the functional unit of F1 in the index of R6. F1 is identified as the DC reconstruction (DCR).

The DCR recognizes 4 input values (i.e. C54, C56, C58 and C65) by referring to the FU-CSCIT 430 and reads the element information from the CSCI storing unit 520. It can be recognized through the mapping to the CSCIT 440 what is the pertinent element information. The DCR completes the processing of the moving picture data having a predetermined macro block size for the pertinent functional unit by using the read element information and stores the processed moving picture data in the buffer memory or the CSCI storing unit 520.

This kind of operation is repeated form the index of R6 to R11 of the F-RT 420. Accordingly, the DCR, IS, IAP, IQ, IT and VR are controlled so as to be successively connected. The connection control unit 530 can recognize whether an arbitrary functional unit completes the processing. If the processing of the pertinent functional unit is completed, the processing of the following functional unit is directed to be processed. Beside that, the corresponding functional unit stores the processed data in a predetermined buffer memory or the CSCI storing unit 520, for the processing of the moving picture data of the following functional unit. The method that the connection control unit 530 recognizes whether an arbitrary functional unit completes the processing is well-known to those of ordinary skill in the art, the pertinent description will be omitted.

The codec 340 can output moving picture data corresponding to the inputted conventional bit-stream 105 by controlling the connection control unit 530 to perform the aforementioned operation, that is, the index order described in the F-RT 420 and/or the index order according to the branch condition.

As understood through the aforementioned description, a linking loop between the tables of the present invention can be roughly divided into 2 loops. In other words, a F-RT loop consists of the F-RT 420, the FL 410, the FU-CSCIT 430, the CSCIT (branch condition applying) and the F-RT (next rule), and an S-RT consists of the S-RT 460, the SET 450, the CSCIT 440, the S-RT 460, the CSCIT (branch condition applying) and the S-RT (next rule).

Also, the F-RT loop can be divided into 2 loops as follows. First, in the case of directing the performance of the MB processing unit 550, the F-RT loop consists of the F-RT 420, the FL 410, the FU-CSCIT 440, F-RT 420, the CSCIT (branch condition appliance) and the F-RT (next rule). In the case of directing the performance of the syntax parser 540, the F-RT loop consists of the F-RT 420, the FL 410, (the S-RT loop), the F-RT 420, the CSCIT (branch condition applying) and the F-RT (next rule).

Similarly, the S-RT loop can be divided into 2 loops as follows. In the case of the branching by using the next regulation rule, the S-RT loop consists of the S-RT 460, the SET 450, the CSCIT 440, the S-RT 460, the CSCIT (branch condition applying) and the S-RT (next rule). In the case of returning to the F-RT 420, the S-RT loop consists of the S-RT 460, the SET 450, the CSCIT 440, the S-RT 460, the CSCIT (branch condition applying) and the F-RT (the index of the called F-RT 420).

The connection of each functional unit equipped in the toolbox 510 by the connection control of the connection control unit 530 according to the F-RT 420 becomes different.

Below is described a command forming each table in detail.

FIG. 31 illustrates a command used in each table for the syntax parsing. The information (i.e. table) for parsing the syntax of the standard such as MPEG-2/MPEG-4/MPEG-4 AVC can be formed by using each illustrated command. Hereinafter, the example of the tables for parsing the MPEG-2 MP (main profile) intra coded syntax will be described based on the linking between each table.

As illustrated in FIG. 31, there are provided READ, SEEK, FLUSH, IF, WHILE, UNTIL, DO~WHILE, DO~UNTIL, BREAK, SET, STOP, and PUSH as a command for forming each table. Of course, it is not necessary that all commands must be used in each table. It shall be obvious that a specific command can be selectively used per table. Below is briefly described the usage of each command.

First, READ is the command for reading a specific bit from the bit-stream. For example, it is represented by the way of "READ bits B>CSCI;" Here, "bits" refers to the number of bits to be read, "B" refers to the byte-alignment. ">CSCI" refers to the CSCI index to be stored. The "B" and ">CSCI" are used as an option. If the ">CSCI" is not designated, it is set to store it in an only variable IBS.

Then, SEEK is the command reading a specific bit from the bit-stream but allowing a file pointer not to move. The file pointer refers to the reference location in the operation such as reading a specific bit. A parameter of the seek command can be applied as the same as the READ.

The FLUSH is the command moving the file pointer as much as the number of bits. Its parameter can be applied similarly to the READ.

The IF, which can be used in a form of "IF (condition) {~} ELSE {~}," is the command providing the branch according to the given condition.

The WHILE, which can be used in a form of "WHILE (condition) {~}," is the command repeating the designated block while the given condition is true.

The UNTIL, which can be used in a form of "UNTIL (condition) {~}," is the command repeating the designated block until the given condition is true.

The DO~WHILE, which can be used in a form of "DO {~} WHILE (condition)," is the command changing the WHILE sentence and performing the designated block before the conditional determination.

The DO~UNTIL, which can be used in a form of "DO {~} UNTIL (condition)," is the command changing the WHILE sentence and performing the designated block before the conditional determination.

The command of (~) (compute) is used in a form of "(C11=(V2+3));". In other words, all calculations of SET-PROC can be written in parentheses, and an operator for 4 fundamental rules of arithmetics, substitution, addition/subtraction (++/—), bitwise operation, logical sum/logical multiply and check of whether to use the CSCI.

The BREAK is the command breaking away from the closest loop structure.

The SET is the command setting a flag for determining whether to use the designated CSCI. The CSCI that will designate the flag can be arranged and be identified by a comma (,), (for example, SET C0, C2;).

The STOP is the command stopping the processing of the syntax element currently performed and performing a next processing.

The PUSH is the command adding given data from the end area written with data. The added values are arranged (e.g. PUSH C8 8, 16, 32;) and identified by the comma.

The GO is the command branching to the designated location. For example, the GO R#;; is the command branching to R#, and the GO RT is the command returning to a called location.

The HEX is the command indicating that a hexadecimal value follows the command of the HEX.

The RLD, which is the interface for an RLD function supported in MPEG-4, can be used in a form of "RLD index, level, run, islastrun, t#;" Here, the index, level, run and islastrun refers to an internal variable and CSCI, storing an RLD return value, and the t# refers to a Huffman table ID used for the LRD.

The VLD2, which is a VLD function for MPEG-2, can be used in a form of "VLD2 [t#] in >v1, v2, v3;" Here, the t# refers to the Huffman table ID, the in refers to an inputted index value and the v1, v2 and v3 refer to output result value.

Finally, the VLD4, which is a VLD function for MPEG-4, can be used in a form of "VLD4 [T#]>CSCI;" Here, the t# refers to the Huffman table ID, and the ">CSCI" refers to the CSCI index to be stored. If the ">CSCI" is not designated as an option, it is set to store it in an only variable IBS.

The detailed examples of each table formed by the aforementioned commands (i.e. each table for the syntax processing for MPEG-2 MP intra coding) are illustrated through FIG. 32 and FIG. 56. In detail, the SET 450 is illustrated in FIG. 32 through FIG. 38, the S-RT 460 is illustrated FIG. 39 through FIG. 43, the CSCIT 440 is illustrated in FIG. 44 through FIG. 47, the FL 410 is illustrated in FIG. 48, the F-RT 420 is illustrated in FIG. 49, the FU-CSCIT 430 is illustrated in FIG. 50 and the DVT 470 is illustrated in FIG. 51 through FIG. 56.

Since the linking between each table has been already described in detail, the generalization of the linking will be briefly described below.

The linking between the tables for the syntax parsing is firstly performed in index order of the F-RT 420 (refer to FIG. 49). In other words, the linking is started from the index of R0.

The R-RT 420 recognizes the index number (F#) of the functional unit corresponding to the index number (R#) to be currently processed. For example, if the index number to be currently processed is R0, F0 (i.e. the syntax parser of the FL 410) is recognized. If the index number to be currently processed is R9, F1 (i.e. the DCR of FL 410 is recognized.

First, the case that the pertinent functional unit is the syntax (i.e. the index number F0 of the FL 410) by the recognized index number will be described.

R# is recognized by using "F#(R#) information written in a "FU" field of the F-RT 420, and the index of S# corresponding to the index of R# in the S-RT 460 is recognized. For example, the "FU" field of the index R0 of the F-RT 420 is written with "F0(R0)," and R0 corresponds to S0 of a syntax field of the S-RT 460.

Then, "Process by SET-PROC" corresponding to the recognized S# is recognized in the SET 450. For example, "Process by SET-PROC" of the SET corresponding to the S0 of the syntax field of the S-RT 460 is "READ 32 B; IF (IBS==HEX:000001B3) C72=1; IF (IBS==HEX:000001B8) C72=2; IF (IBS==HEX:00000100) C72=3; IF (IBS=HEX:000001B7) C72=4;"

The result of calculating the "Process by SET-PROC" of the SET 450 is stored corresponding to C# of an "output" field of the pertinent index S/f. For example, the "Process by SET-PROC" of the SET corresponding to the S0 of the syntax field of the S-RT 460 is stored as C72.

If the calculating result is completed to be stored, it is determined by re-referring to the S-RT 460 which branch information the stored CSCI information satisfies. In the case of the index R0 of the S-RT 460, it is determined which one of the branch information "1: (C72==1) GO R1; 2: (C72==2) GO R39; 3: (C72==3) GO R47; and 4: (C72==4) GO RT;" C72 of the CSCI. In the case of satisfying any one of 1 through 3 in the aforementioned 4 conditions, the corresponding index R# in the S-RT 460 progresses and the aforementioned operation is repeated. However, in the case of satisfying the forth condition (i.e. (C72==4) GO RT), the operation returns to the F-RT 420.

Then, the case that that the pertinent functional unit is not the syntax (i.e. the index number F0 of the FL 410) by the recognized index number will be described.

The number of an input CSCI corresponding to the pertinent F# is recognized by using the FL 410 and the "F#" written in the "FU" field of the F-RT 420. For example, "F1" is written in the "FU" field of the index R9 of the F-RT 420. In the FL 410, F1 is the DCR and the request of 4 input CSCI is written.

If the number of input CSCI requested by referring to the FL 410 is not zero, the CSCI value C# corresponding to a "F#(C#)" field is recognized by referring to the FU-CSCIT 440, and the corresponding value is read in the CSCI storing unit 520.

Then, the pertinent functional unit generates output data by using inputted data (e.g. MB data) and input CSCI values, and then, returns to the F-RT 420.

As described above, in case that the pertinent functional unit is not the syntax parser (i.e. the index number F0 of the FL 410), if it satisfies "GO RT," a predetermined operation is completed, and then, returns to the F-RT 420.

The F-RT 420 determines the branch condition according to the C# of the current step, and the corresponding step progresses. If the satisfied condition is END (e.g. (C72==4) GO END;), the syntax parsing is ended. If the satisfied condition is to direct to the R# (e.g. GO R1), the pertinent index progresses.

Figure 9:
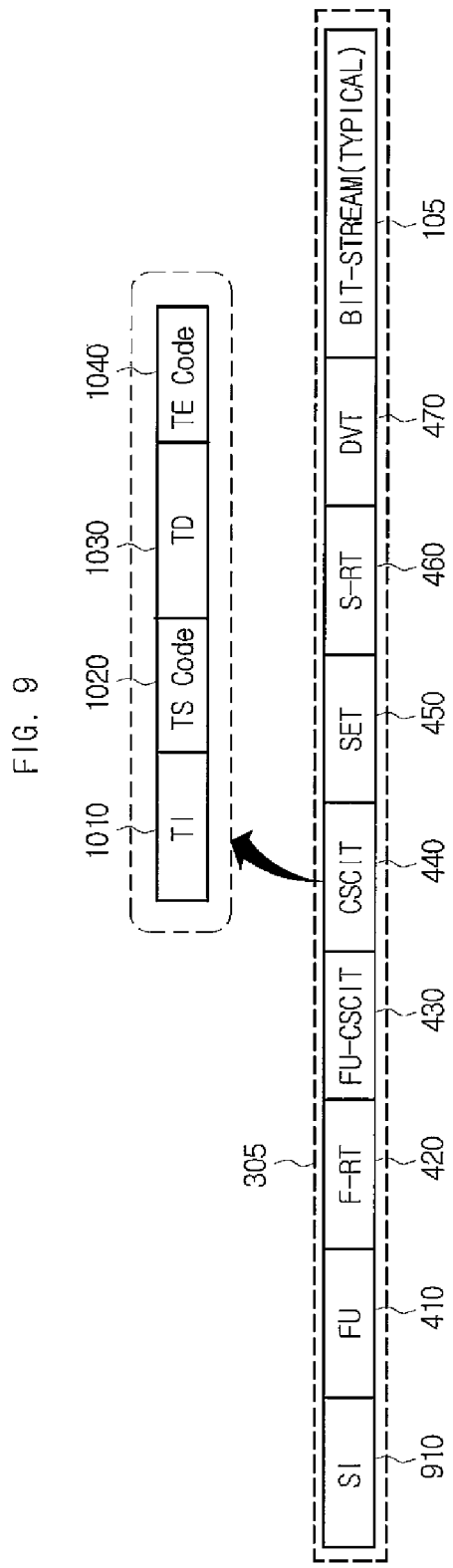
FIG. 9 illustrates the structure of a universal bit-stream in accordance with a second embodiment of the present invention.

FIG. 8 illustrates the structure of a universal bit-stream in accordance with a first embodiment of the present invention, FIG. 9 illustrates the structure of a universal bit-stream in accordance with a second embodiment of the present invention, FIG. 10 illustrates the structure of a universal bit-stream in accordance with a third embodiment of the present invention and FIG. 11 illustrates the structure of a universal bit-stream in accordance with a forth embodiment of the present invention.

As illustrated in FIG. 8 through FIG. 10, the decoding description included in the universal bit-stream 305 of the present invention can be configured so as not to include table information but to include applied standard information (no table), so as to include all table information (full tables) and so as to include only some table information (partial tables). In order to identify each of them, the decoding description information can include stream identifier (SI) information. The SI information can include some items as shown in the follow table 2.

TABLE 2

Stream Identifier

| SI | Decoding Description |
|---|---|
| 00 | No table |
| 01 | Full tables |
| 10 | Partial tables |

As illustrated in FIG. 8, the universal bit-stream 305, which is decoding description, can include an SI 910 (i.e. 00) indicating 'no table' and a codec number 920 and a profile and level number 930.

This shows the case of not sending the table information but using the table information already stored in the table storing unit 330. Although the pertinent conventional bit-stream 105 sends basic information related to the used codec and profile and level, the codec unit 340 can perform the decoding by using the designated table.

For this, the SET(450), the CSCIT(440), the FL(410), the FU-CSCIT(430) and the DVT(470) can be described per applied standard (i.e. codec), and the F-RT 420 and the S-RT 460 can be described per profile of each applied standard.

TABLE 3

Table Identifier per codec

| Standard | | | Table Identifier | | |
|---|---|---|---|---|---|
| MPEG-1 | SET #1 | FL #1 | FU-CSCIT #1 | CSCIT #1 | DVT #1 |
| MPEG-2 | SET #2 | FL #2 | FU-CSCIT #2 | CSCIT #2 | DVT #2 |
| MPEG-4 | SET #3 | FL #3 | FU-CSCIT #3 | CSCIT #3 | DVT #3 |
| AVC | SET #4 | FL #4 | FU-CSCIT #4 | CSCIT #4 | DVT #4 |

TABLE 4

Table Identifier per profile and level

| SI | Table Identifier | |
|---|---|---|
| MPEG-1 | F-RT #1-1 | S-RT #1-1 |
| MPEG-2 MP | F-RT #2-1 | S-RT #2-1 |
| MPEG-4 SP | F-RT #3-1 | S-RT #3-1 |
| MPEG-4 ASP | F-RT #3-2 | S-RT #3-2 |
| AVC BP | F-RT #4-1 | S-RT #4-1 |

In the case of MPEG-4 SP, the decoding method can be described by using SET#3, FL#3, CSCIT#3, FU-CSCIT#3, DVT#3, F-RT#3-1, and S-RT#3-1. If the codec number is designated as 3 and the profile and level number is designated as 2, the codex unit 340 can perform the decoding operation by referring to the corresponding table.

Also, as illustrated in FIG. 9, the universal bit-stream 305, which is a decoding description, can include all aforementioned table information. In this case, when referring to the table 2, the S1910 will be set as 01. Each table can include a table identifier (IT) 1010, a table start code (TS code) 1020, a table description (TD) 1030 and a table end code (TE code) 1040. The order of the IT 1010 and the TS code can be changed, and the TD 1030 cam be described in a form of binary description. Of course, the order of each table can be changed.

Also, as illustrated in FIG. 10, the universal bit-stream 305, which is the decoding description, can include some aforementioned table information and a codec number corresponding table information. In this case, when referring to the table 2, the S1910 will be set as 10. However, in this case, since the format of the table information is not unified, preferably, a format identifier 1110 can be farther equipped behind the TI 1010 so as to determine the format of the pertinent table information.

Beside that, as illustrated in FIG. 11, the universal bit-stream 305 can further include a decoding description related to the table information (T-DD) 1210 and renewing information. The T-DD 1210 can be any one of decoding descriptions described by referring to FIG. 8 through FIG. 10, and the S1910 will be set as the corresponding value. The renewing information can include a revision start code (RS code) 1220 and a revision 1230.

The revision 1230, which is added, deleted or renewed with regulation rule of an arbitrary table, can be provided in a form of 'insert index into table-name ( );', 'delete index from table-name;', 'update index in table-name( );'

For example, in the case of adding S100 into the SET#4, the revision 1230 can be provided in a form of 'insert S100 into SET#4 ("READ 1;IF(IBS==1){SET C31;}");' In the case of deleting R31 from the S-RT#3-1, the revision 1230 can be provided in a form of 'delete R31 from S-RT#3-1;' In the case of updating R7 in the F-RT#2-1, the revision 1230 can be provided in a form of 'update R7 in F-RT#2-1 (F6, 1: (C66<=6) GO R5; 2: (C65<=C67) GO R4; 3: GO R12;);'

While the DDD 320 reads the revision 1230 and the decoding of the pertinent universal bit-stream 305 is performed, the tables changed with their revisions are allowed to be stored. However, once the decoding is completed, the pertinent tables stored in the table storing unit must be returned to an original state. The codec unit 340 or the trigger can notify a completing notification, related to whether to complete the decoding, to the DDD 320 or the DDD 320 can monitor whether the completion of the codec 340 is performed.

As described above, in accordance with the present invention, the conventional profile can be by using a functional unit provided by the conventional standard (i.e. codec), a new decoder can be configured by using the conventional functional unit or a new decoder can be realized by using a new functional unit. In other words, a decoder can be embodied without any restriction.

Only in the case of adding a new functional unit into the toolbox 510, the algorithm (i.e. a description related to the functional unit) related to the pertinent functional unit must be added and the pertinent information must be added into the FL 410. In this case, there can be additionally requested a compile operation related to the algorithm.

To realize a unified codec, each element must be organically controlled such that a bit-stream, encoded by various encoding methods, can be decoded by a decoding method corresponding to the pertinent encoding method, by parsing the encoded bit-stream.

In this case, the pertinent bit-stream can be the bit-stream formed in various forms mixed with diverse standards (codecs) or generated by various encoding methods in one standard. Also, various functional units used in the diverse standards must be divided into separate units, and an only function necessary for a user must be selected to make one codec (encoder or decoder), in order to support various decoding/encoding methods.

As described above, the present invention can organically connect and control each functional unit by an identical information analyzing method regardless of an encoding method encoded with a bit-stream by allowing a decoding description to be provided.

Also, although the syntax of a bit-stream is changed or newly added, the appropriate processing can be performed by only changing the pertinent information of the S-RT 460 or only inserting the additional information. Beside that, the connection of functional units of the MB processing unit 550 in the pertinent decoder can be set by selecting a function necessary for user and forming the F-RT 420 in processing units of bit-stream level, frame level and MB level.

Figure 12:
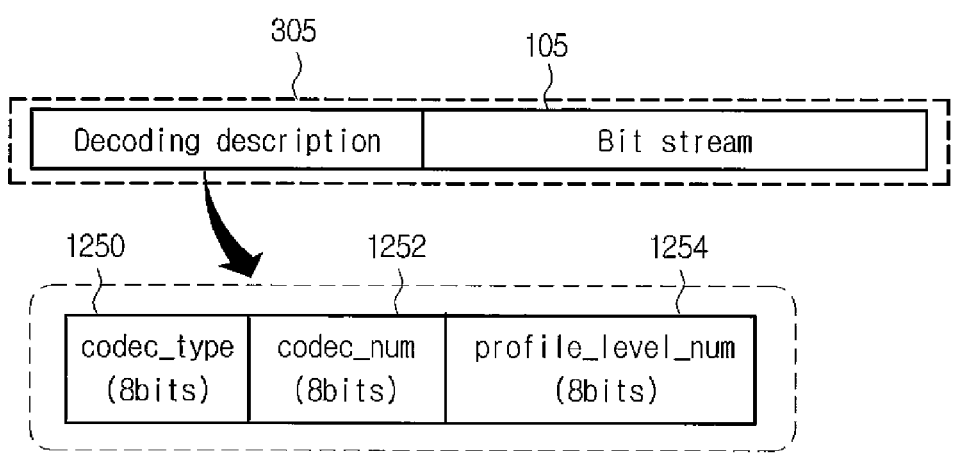
FIG. 12 illustrates the structure of a universal bit-stream in accordance with a fifth embodiment of the present invention.
Figure 13:
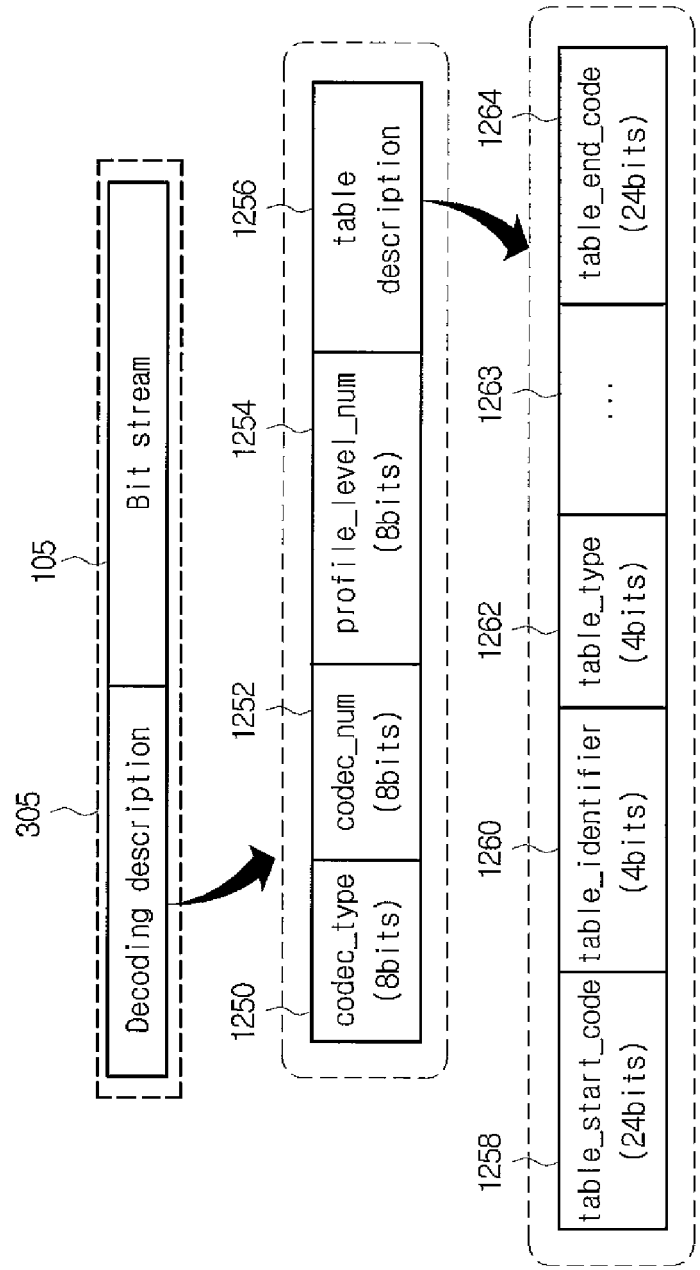
FIG. 13 illustrates the structure of a universal bit-stream in accordance with a sixth embodiment of the present invention.
Figure 14:
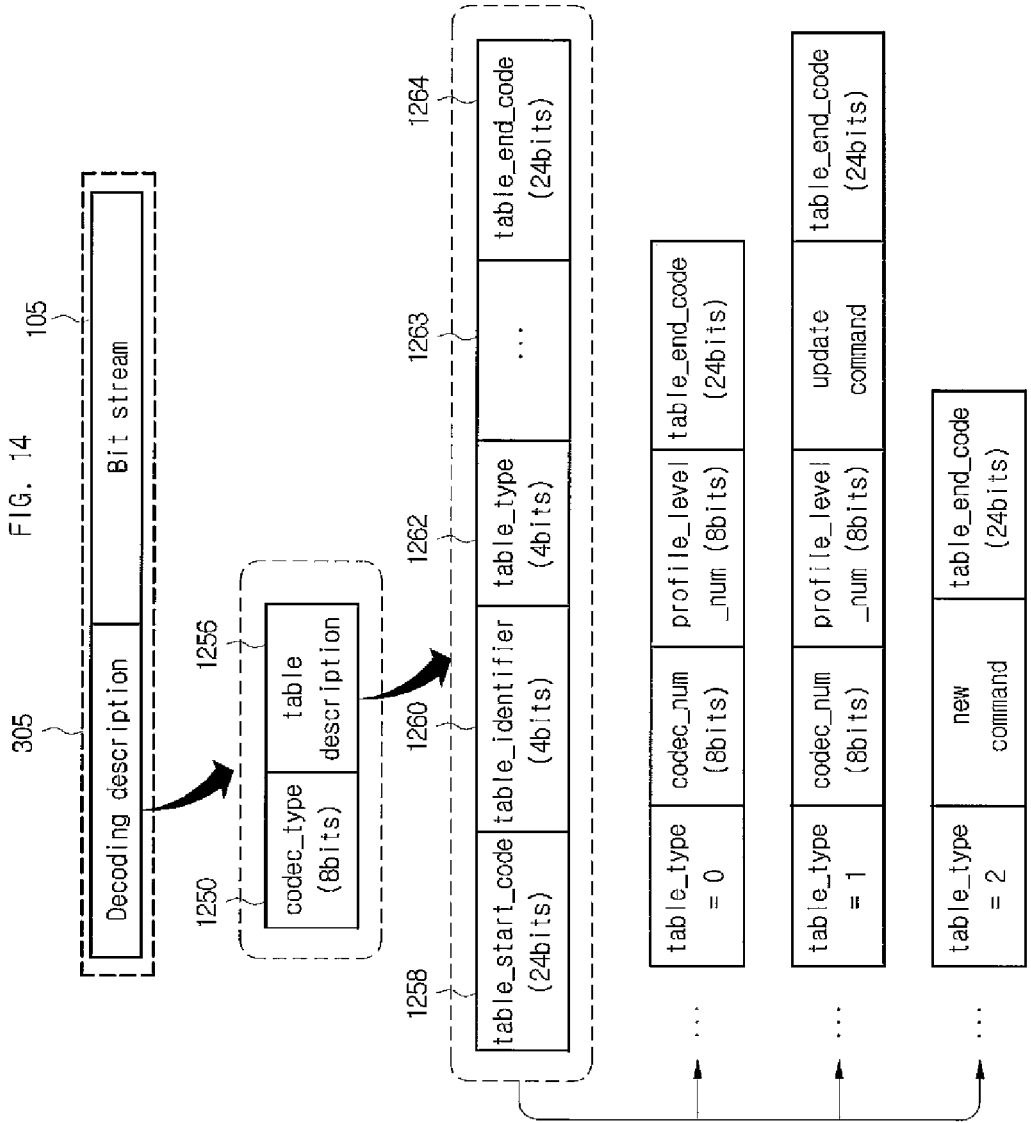
FIG. 14 illustrates the structure of a universal bit-stream in accordance with a seventh embodiment of the present invention.
Figure 15:
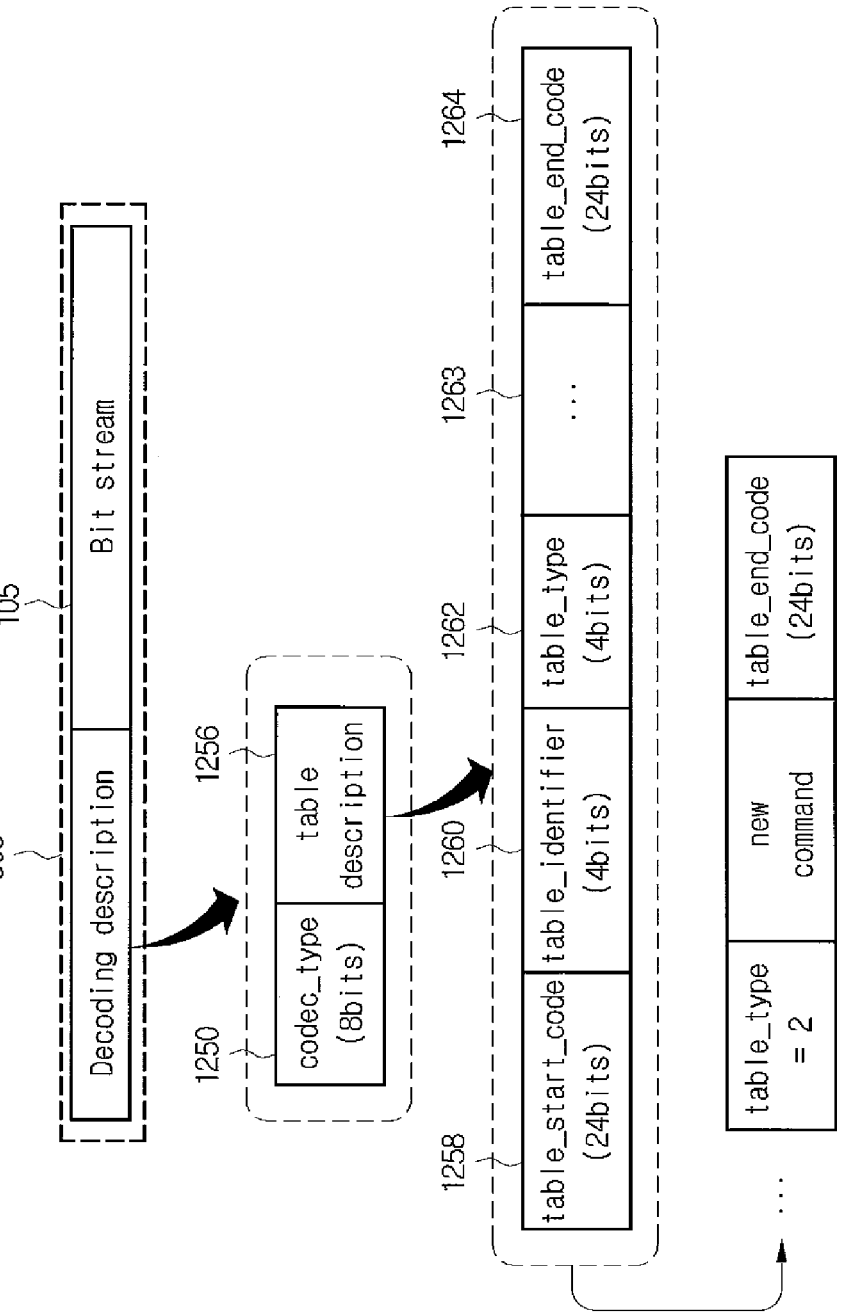
FIG. 15 illustrates the structure of a universal bit-stream in accordance with an eighth embodiment of the present invention.

FIG. 12 illustrates the structure of a universal bit-stream in accordance with a fifth embodiment of the present invention, FIG. 13 illustrates the structure of a universal bit-stream in accordance with a sixth embodiment of the present invention, FIG. 14 illustrates the structure of a universal bit-stream in accordance with a seventh embodiment of the present invention and FIG. 15 illustrates the structure of a universal bit-stream in accordance with an eighth embodiment of the present invention.

The universal bit-stream 305 of the present invention consists of a decoding description (DD) part and the conventional bit-stream 105, it is well-known to those of ordinary skill in the art that the conventional bit-stream 105 consists of coded video data (or/and coded audio data).

Here, the DD part having a different structure can be formed in accordance with the codec property to be applied for decoding the conventional bit-stream 105. In other words, first, in the case of using one standardized codec, a first decoding description structure can be applied.

Second, in the case of changing some contents of one codec and using the codec (i.e. using the table contents, as they are, corresponding to the pertinent codec in some tables of the 7 aforementioned tables and changing and using the other tables), a second decoding description structure can be applied.

Third, in the case of processing and using the table information of the conventional standardized plural codec, (i.e. selectively using the table contents of the conventional standardized plural codec for some tables of the 7 aforementioned tables and changing and using the other tables), a third decoding description structure can be applied.

Fourth, in the case of using a new codec that is not conventionally standardized (including and transmitting all 7 aforementioned tables formed with new contents), a fourth decoding description structure can be applied.

The 4 aforementioned structures of the decoding descriptions can be identified as different codec type information, respectively. For example, the first decoding description structure is set as "codec_type=0". The second decoding description structure is set as "codec_type=1". The third decoding description structure is set as "codec_type=2". The fourth decoding description structure is set as "codec_type=3".

FIG. 12 illustrates the first decoding description structure.

In accordance with the first decoding description structure illustrated in FIG. 12. The decoding description part can consist of a codec type 1250, a codec number 1252 and a profile and level number 1254. In other words, in accordance with the first decoding description structure, the decoding description part is described based on only information related to the codec to be applied. Although the drawings assume that each field is 8 bits, it shall be obvious that the size of each field can be adjusted depending on the magnitude of information to be represented.

The codec type 1250 will be set as zero (i.e. codec_type=0). This shows the case of using one codec, as it is, of the conventional various standardized codecs.

FIG. 13 illustrates the second decoding description structure.

In accordance with the second decoding description structure illustrated in FIG. 13, the decoding description part can consist of the codec type 1250, the codec number 1252, the profile and level number 1254 and the table description 1256. In other words, in accordance with the second decoding description structure, the decoding description part is described based on the information related to the codec to be applied and changed contents of 7 tables. Here, the table descriptions are individually equipped in the 7 tables, respectively. In other words, there can be 7 table descriptions in the decoding description part.

Each table description 1256, as illustrated in FIG. 13, can include the table start code 1258, the table identifier 1260, the table type 1262, the content 1263 and the table end code 1264. Of course, the size of each field can be increased or decreased as necessary. Also, as described below, the content 1263 can be omitted or included according to the information of the table type 1262.

For example, if the value of the table type 1262 is zero, the table description 1256 can be recognized so as to be applied without changing an existing table (i.e. table recognized by the codec type 1250, the codec number 1252, the profile and level number 1254 and the table identifier 1260). In this case, the content 1263 can be omitted.

However, if the value of the table type 1262 is 1, the table description 1256 can be recognized so as to partially change (i.e. change to the contents defined in the contents 1263) and use an existing table (i.e. table recognized by the codec type 1250, the codec number 1252, the profile and level number 1254 and the table identifier 1260). In this case, the content 1263 can be described with the changed content (e.g. a update command). For example, the changed content (e.g. the update command) can be the information including commands such as update, insert, or/and delete and changing the table content of the index corresponding to the pertinent table.

However, if the value of the table type 1262 is 2, the table description 1256 can be recognized so as to completely change (i.e. change to the contents defined in the contents 1263) and use an existing table (i.e. table recognized by the codec type 1250, the codec number 1252, the profile and level number 1254 and the table identifier 1260). In this case, the content 1263 can be described with the changed content (e.g. content for newly defining the pertinent table such as a new command).

FIG. 14 illustrates the third decoding description structure.

In accordance with the third decoding description structure illustrated in FIG. 14, the decoding description part can consist of the codec type 1250 and the table description 1256. In other words, in accordance with the third decoding description structure, the decoding description part is described based on the information related to the codec to be applied and the changed contents of the 7 tables. Here, the table descriptions are individually equipped in the 7 tables, respectively. In other words, there can be 7 table descriptions in the decoding description part.

Each table description 1256, as illustrated in FIG. 14, can include the table start code 1258, the table identifier 1260, the table type 1262, the content 1263 and the table end code 1264. Of course, the size of each field can be increased or decreased as necessary.

For example, if the value of the table type 1262 is zero, the table description 1256 can be recognized so as to be applied without changing an existing table (i.e. table recognized by the codec number 1252, the profile and level number 1254 and the table identifier 1260). In this case, there are described the codec number 1252 corresponding to the table to be applied to a field of the content 1263, and the profile and level number 1254.

However, if the value of the table type 1262 is 1, the table description 1256 can be recognized so as to partially change (i.e. change to the contents defined in changed contents 1266) and use an existing table (i.e. table recognized by the codec number 1252, the profile and level number 1254 and the table identifier 1260). In this case, the content 1263 can be described with the changed content (e.g. update command), and a field of the changed contents 1266 can be described with the changed contents (e.g. the update command).

However, if the value of the table type 1262 is 2, the table description 1256 can be recognized so as to completely change (i.e. change to the contents defined in the field of the content 1263) and use an existing table (i.e. table recognized by the codec type 1250, the codec number 1252, the profile and level number 1254 and the table identifier 1260). In this case, the content 1263 can be described with the changed content (e.g. content for newly defining the pertinent table such as a new command). In other words, as described above, if the table type 1262 is zero or 1, a specific codec is used as it is or some tables are changed and used. Accordingly, the information related to the codec (i.e. the codec number 1252 and the profile and level number) is requested. If the table type 1262 is 2, completely new table information is defined. Accordingly, the additional codec information is not requested.

FIG. 15 illustrates the fourth decoding description structure.

In accordance with the fourth decoding description structure illustrated in FIG. 15, the decoding description part can consist of the codec type 1250 and the table description 1256. In other words, in accordance with the fourth decoding description structure, the decoding description part is described based on the 7 tables. The table descriptions are individually equipped in the 7 tables, respectively.

Each table description 1256, as illustrated in FIG. 14, can include the table start code 1258, the table identifier 1260, the table type 1262, the content 1263 and the table end code 1264. Of course, the size of each field can be increased or decreased as necessary.

For example, if the value of the table type 1262 is a predetermined value (e.g. 2), the field of the content 1263 is displayed with the information for describing a new table corresponding to the table identifier 1260 (e.g. content for newly defining the pertinent table such as the new command). As described above, in case that the codec type 1250 is 3, it is recognized that the decoding is performed by using new tables. Accordingly, one table type 1262 can be designated or the table type 1262 can be omitted.

Hereinafter, the syntax structure of the decoding description part and the syntax structure of each field are illustrated in each below table.

TABLE 5

Decoding Description

| Decoder_Description( ) { | No. of bits |
|---|---|
| codec_type | 8 |
| if ((codec_type==0x00) \|\| (codec_type==0x01)) { | |
| Codec_Description( ) | |
| } | |
| if (codec_type!=0x00) { | |
| do { | |
| Table_Description( ) | |
| } while (next_bits( )==table_idetifier) | |
| } | |
| } | |

TABLE 6

Codec Description

| Codec_Description( ) { | No. of bits |
|---|---|
| codec_num | 8 |
| profile_level_num | 8 |
| } | |

TABLE 7

Table Description

| Table_Description( ) { | No. of bits |
|---|---|
| table_start_code | 24 |
| table_identifier | 4 |
| table_type | 4 |
| if ((table_type =='0000') \|\| (table_type =='0001')) { | |
| if (codec_type==0x02) | |
| Codec_Description( ) | |
| if (table_type =='0001') | |
| Update_Description( ) | |
| } | |
| if (table_type =='0010') { | |
| New_Description( ) | |
| } | |
| table_end_code | 24 |
| } | |

TABLE 8

Update Description

| Update_Description( ) { | No. of bits | Mnemonic |
|---|---|---|
| Update_Command | | vlclbf |
| } | | |

TABLE 9

New Description

| New_Description( ) { | No. of bits | Mnemonic |
|---|---|---|
| New_Command | | vlclbf |
| } | | |

Hereinafter, the semantics of the decoding description are described with each below table.

TABLE 10

Decoding Description

| Codec_type | Meaning |
|---|---|
| 0x00 | A profile@level of an existing MPEG standard |
| 0x01 | Some parts of the existing one profile@level changed |
| 0x02 | Some parts of the existing multiple profile@level changed |
| 0x03 | A new decoding solution |
| 0x04-0xFF | RESERVED |

Here, the codec type, which is a 8 bit code, can be the information for identifying the codec type.

TABLE 11

Codec Description

| Codec_num | MPEG standards and others |
|---|---|
| 01 | MPEG-1 |
| 02 | MPEG-2 |
| 03 | MPEG-4 Part 2 |
| 04 | MPEG-4 Part 10 (AVC) |
| 05-FF | RESERVED |

Here, the codec type, which is a 8 bit code, can be the information for indicating the code of a used codec code. Also, the profile and level number, which is a bit code, can be the information for directing to the number of the profile and level for the codec. The profile and level number can be identical to that of the standard of each MPEG standard.

TABLE 12

Table Description (Table identifier)

| Table_identifier | Table name |
|---|---|
| 0000 | SET (Syntax Element Table) |
| 0001 | S-RT (Syntax Rule Table) |
| 0010 | CSCIT (CSCI Table) |
| 0011 | DVT (Default Value Table) |
| 0100 | FL (FU List) |
| 0101 | F-RT (FU Rule Table) |
| 0110 | FU-CSCIT (FU CSCI Table) |
| 0111-1111 | RESERVED |

Here, the table start code can be 0xFFFFFE of hexadecimal 26-bit text strings, which refers to the start of the table description. The table identifier can be a 4 bit code as illustrated in the table 12 above.

TABLE 13

Table Description (Table type)

| Table_type | Meaning |
|---|---|
| 0000 | conventional table |
| 0001 | updated table |
| 0010 | new table |
| 0011-1111 | RESERVED |

Here, the codec type, which is a 4 bit code, can be the information for determining whether to maintain an existing table, to update the existing table or to generate a new table. The table end code can be 0xFFFFFE of hexadecimal 26-bit text strings, which refers to the end of the table description.

TABLE 14

Directing set for update_command

| Code | Instruction | Usage |
|---|---|---|
| 00 | UPDATE | UPDATE [index#] in [table#] [a record]; |
| 01 | INSERT | INSERT into [table#] [a record]; |
| 10 | DELETE | DELETE [index#] from [table#]; |
| 11 | RESERVED | |

Here, index# can be 4-bit strings directing to the index number of an arbitrary table, and table# can be 32-bit strings as the table identifier.

TABLE 15

Directing set for new_command

| Code | Instruction | Usage |
|---|---|---|
| 00000001 | READ | READ bits B > CSCI; |
| 00000010 | SEEK | SEEK bits B > CSCI; |
| 00000011 | FLUSH | FLUSH bits B; |
| 00000100 | IF | IF (condition) { ~ } ELSE { ~ } |
| 00000101 | WHILE | WHILE (condition) { ~ } |
| 00000110 | UNTIL | UNTIL (condition) { ~ } |
| 00000111~0 | DO~WHILE | DO { ~ } WHILE (condition) |
| 00000111~1 | DO~UNTIL | DO { ~ } UNTIL (condition) |
| 00001000 | ( ~ ) (compute) | (........) |
| 00001001 | BREAK | BREAK; |
| 00001010 | SET | SET CSCI, CSCI; |
| 00001011 | STOP | STOP; |
| 00001100 | PUSH | PUSH CSCI Value, Value; |
| 00001101 | RLD | RLD index, level, run, islastrun, t#; |
| 00010010 | VLD2 | VLD2 [T#] in > v1, v2, v3; |
| 00010100 | VLD4 | VLD4 [T#] > CSCI; |

Here, "bits" is any one of 3 through 34 bits for indicating the number of the requested bits, and "B" is 1-bit strings indicating a byte alignment. ">" is 1-bit strings for printing left output, and VLD2 (for MPEG-2) and VLD4 (for MPEG-4) is functions for entropy coding.

Figure 16:
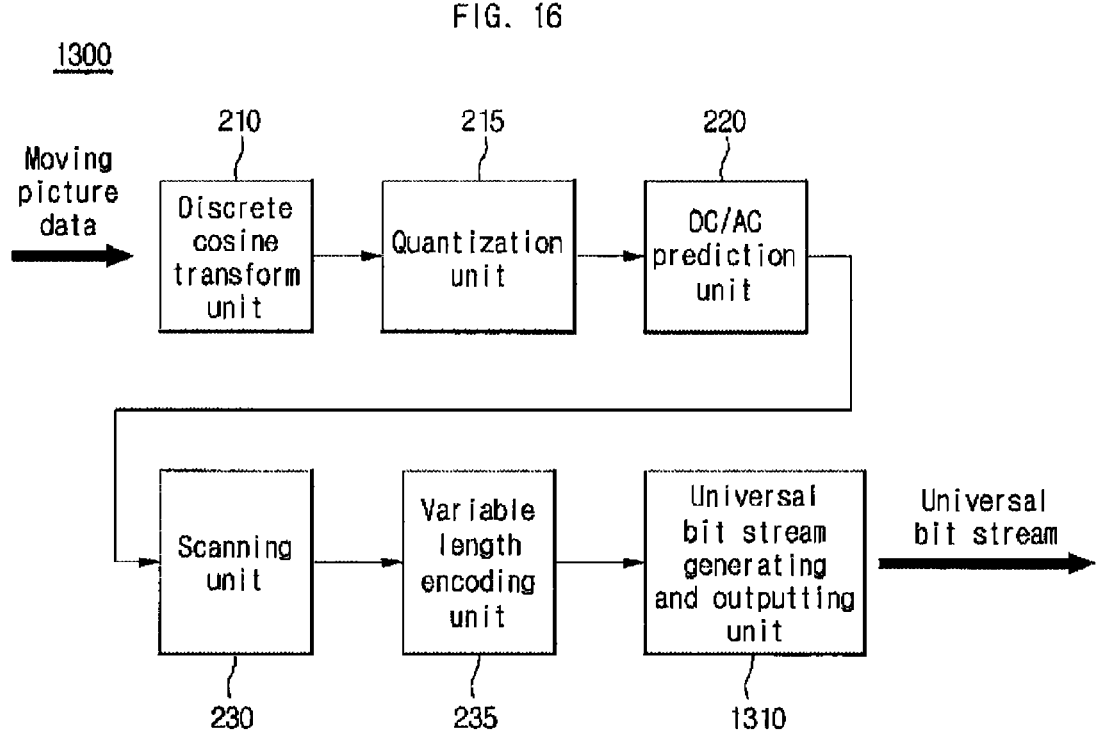
FIG. 16 is a block diagram illustrating a encoder in an embodiment of the present invention.

FIG. 16 is a block diagram illustrating an encoder in an embodiment of the present invention.

The encoder 1300 of the present invention further includes a universal bit-stream generating and outputting unit 1310 as compared with the conventional encoder 200 described earlier by referring to FIG. 2. The universal bit-stream generating and outputting 1310 generates a decoding description by using control information (e.g. the list and the connection of the used functional units, the input data of the pertinent functional units, the syntax information and the syntax connection information) in the generating operation of the conventional bit-stream 105 generated by the processing of the prior operation. Beside that, the universal bit-stream 305 is generated by using the generated decoding description and the conventional bit-stream 105 to be transmitted to the decoder 300. Since the method of generating the decoding description is understood enough by those of ordinary skill in the art with only aforementioned descriptions, the pertinent description will be omitted.

The variable length encoding unit 235 of the present invention is merely pointed to an element for finally performing the encoding to the conventional bit-stream 105 in the encoder 1300, but not limited to the present invention. Also, this does not cause to restrict the scope of claims of the present invention.

FIG. 16 assumes the case of providing the universal bit-stream 305, generated by using decoding description information and the conventional bit-stream 305, to the decoder.

However, as described above, the decoding description can be transferred in a form of separate data or bit-stream to the decoder 300. In this case, it shall be obvious that the universal bit-stream generating and outputting 1310 is not located behind the variable length encoding unit 235, but is provided independently of the conventional encoding unit, so as to provide independently generated information to the decoder 300.

Although the above description related to a unified codec device and method of the present invention is based on a decoder, the mutual relation between the decoder and an encoder is well-known to those of ordinary skill in the art, and considering that the encoder can be easily formed through the only detailed description related to the decoder, it is obvious that the present invention is not limited to the decoder.

As described above, the unified codec device and method of the present invention makes it easy to analyze a syntax element and control the connection of functional units in one standard (or codec) or between standards (or codecs). In other words, it is no problem to change the order of syntax elements in the bit-stream generated according to a specific standard, to add a new syntax element or to delete the existing syntax element.

Beside that, in accordance with the conventional art, the decoder was unable to properly decode the pertinent bit-stream in the manipulation of the syntax element. For example, if the bit-stream of ABC is changed to ACB and transmitted, the decoder is unable to recognize the bit-stream of ACB, to thereby making it impossible to properly decode the bit-stream of ACB. Similarly, in the case of adding F and forming ABFC or deleting B and forming AC, the proper decoding is impossible.

However, in accordance with the unified codec device and method of the present invention, since the decoding description information is provided in a form of being included in the universal bit-stream or separate data, the decoding operation of the decoder 300 can be smoothly performed.

It shall be obvious that although the above description related to a unified codec device and method of the present invention is based on MPEG-4 AVC, MPEG-1, MPEG-2, MPEG-4 and other moving picture encoding/decoding standards can be applied without any restriction.

Beside that, it is obvious that the information included in each table can be described by using not only the information the connection of functional units for performing the decoding by one standard and the information related to the processing operation requested for the pertinent functional unit but also the information for performing the decoding by a plurality of standards.

For example, it is assumed that an initial plurality of frames of encoded video data included in the universal bit-stream are encoded by using MPEG-2, the following plurality of frames are encoded by using MPEG-4 and the other frames are encoded by using MPEG-1. In this case, it is obvious that table information included in the decoding description for decoding the encoded video data will be realized such that the functional units according to each standard included in the toolbox 510 can be organically coupled and operated, in order that each frame having different encoding methods can be decoded.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

INDUSTRIAL APPLICABILITY

As described above, the present invention can decode a bit steam encoded by various types (syntax and semantics) in accordance with each standard (e.g. MPEG-1, MPEG-2, MPEG-4, MPEG-4 AVC) by using the same information recognizing method.

The present invention can parse a bit stream compressed by various methods by using the same information analyzing method and organically control each functional unit for decoding by using the parsed data.

The present invention can commonly apply a syntax analyzing method for decoding various types of bit streams.

The present invention can apply a set of new commands for being capable of parsing a bit stream in various forms by using a common syntax analyzing method.

The present invention can easily decode a bit stream when a syntax element is changed, added or deleted.

The present invention can share elements used for the bit stream decoding of the element information (i.e. a result from syntax parsing) of analyzed syntax.

The present invention can use the element information of analyzed syntax to analyze following bit stream syntax element.

The present invention can be used when unifying moving picture and still image codecs processed in units of block in addition to MPEG-1, MPEG-2, MPEG-4 and MPEG-4 AVC.

The present invention can divide the functions forming various decoding methods suggested by diverse standards (codecs) per each functional unit and store the divided functions in a toolbox.

The present invention can select in a toolbox and decode a functional unit necessary for decoding a bit stream encoded in various forms.

In addition, the present invention can change, add or delete a functional unit stored in a tool box.

The invention claimed is:
1. A decoding device, comprising:
a table storing unit;
a decoding description decoder configured to generate and store in the table storing unit n tables corresponding to an input decoding description, n being a natural number; and
a codec unit configured to decode and output encoded video data, included in a bit-stream input corresponding to the decoding description, to moving picture data by using the tables stored in the table storing unit,
wherein the decoding description comprises content for defining the n tables, and the codec unit comprises:
a toolbox, including a plurality of functional units, respectively, configured to perform a predetermined process;
a control signal and context information (CSCI) storing unit, configured to store a plurality of information generated by syntax parsing of the bit-stream by at least one of the plurality of functional units;
a connection control unit, referring to at least one of the tables, configured to:
recognize a processing order of the plurality of functional units,
activate a functional unit according to the at least one table, wherein the connection control unit includes a first index identifying a first connection rule for the plurality of functional units, and the activated functional unit to be processed corresponding to the first index,
process branch information which refers to a conditional determining algorithm,
wherein the conditional determining algorithm which is referred to by the branch information is used to determine a second index identifying a second connection rule for the plurality of functional units, and
wherein the second index is processed after the first index, and
determine the second index that is processed after the first index based on the results of the processed conditional determining algorithm.

2. The decoding device of claim 1, wherein the toolbox comprises:
a parsing unit configured to generate and store in the CSCI storing unit a plurality of element information by the syntax parsing of the bit-stream, generate the encoded video data to macro block data having a predetermining size, and successively output the macro block data; and
a plurality of processing functional units, designated with each process to be performed for converting the macro block data into the moving picture data.

3. The decoding device of claim 1, wherein the tables comprise a syntax element table (SET) indicating a process for generating information related to a bit-stream syntax and element information corresponding to the bit-stream syntax; a syntax rule table (S-RT), indicating a connection between bit-stream syntaxes; a control signal and context information table (CSCIT), indicating detailed information related to the element information, an FU-rule table (F-RT), successively selecting the plurality of functional units; an FU list (FL), indicating a list of the functional units; and an FU-CSCIT, indicating element information to be input into the selected functional unit.

4. A decoding device, comprising:
a table storing unit configured to store a plurality of tables organically linked;
a syntax parser configured to store a plurality of element information, generated by a syntax-parsing of an input bit-stream, in an element information storing unit, and successively output macro block data corresponding to encoded video data;
an MB processing unit, including a plurality of functional units realized to process each predetermined processing operation;
a connection control unit, referring to at least one of the tables, configured to:
recognize the processing order of the plurality of functional units,
activate a functional unit according to the at least one table, wherein the connection control unit includes a first index identifying a first connection rule for the plurality of functional units, and the activated functional unit to be processed corresponding to the first index,
process branch information which refers to a conditional determining algorithm,
wherein the conditional determining algorithm which is referred to by the branch information is used to determine a second index identifying a second connection rule for the plurality of functional units, and
wherein the second index is processed after the first index,
determine the second index that is processed after the first index based on the results of the processed conditional determining algorithm; and
a decoding description decoder configured to generate the tables corresponding to an input decoding description, whereas an arbitrary functional unit, activated by the connection control unit, is configured to process and output the macro block data by using predetermined element information of element information stored in the element information storing unit.

5. The decoding device of claim 4, wherein the tables comprise a syntax element table (SET) indicating a process for generating information related to a bit-stream syntax and element information corresponding to the bit-stream syntax; a syntax rule table (S-RT), indicating a connection between bit-stream syntaxes; a control signal and context information table (CSCIT), indicating detailed information related to the element information, an FU-rule table (F-RT), successively selecting the plurality of functional units; an FU list (FL), indicating a list of the functional units; and an FU-CSCIT, indicating element information to be input into the selected functional unit.

6. An encoding device, comprising:
an encoding configured to convert and input a moving picture into a bit-stream according to a predetermined encoding method by successively using a plurality of functional units;
a description information generating unit, configured to generate syntax information of the bit-stream and description information according to the connection and processing order of the functional units,
whereas the bit-stream and the description information are provided to a decoding device,
wherein the description information comprises a table including a first index identifying a first connection rule for the plurality of functional units, and an activated functional unit to be processed corresponding to the first index,
wherein branch information which is processed refers to a conditional determining algorithm,
wherein the conditional determining algorithm which is referred to by the branch information is used to determine a second index identifying a second connection rule for the plurality of functional units, and
wherein the second index is processed after the first index.

7. The encoding device of claim 6, wherein the description information comprises a syntax element table (SET) indicating a process for generating information related to a bit-stream syntax and element information corresponding to the bit-stream syntax; a syntax rule table (S-RT), indicating a connection between bit-stream syntaxes; a control signal and context information table (CSCIT), indicating detailed information related to the element information, an FU-rule table (F-RT), successively selecting the plurality of functional units; an FU list (FL), indicating a list of the functional units; and an FU-CSCIT, indicating element information to be input into the selected functional unit.

8. A decoding method, comprising:
(a) receiving a bit-stream and description information;
(b) generating and storing a plurality of tables corresponding to the description information;
(c) storing in an element information storing unit a plurality of element information generated by a syntax parsing of the bit-stream by using at least one table;
(d) converting encoded video data of the bit-stream into macro block data of a predetermined size and successively outputting the macro block data;
(e) activating an arbitrary functional unit among a plurality of functional units by referring to the at least one table including a first index identifying a first connection rule for the plurality of functional units, and the activated functional unit to be processed corresponding to the first index, processing branch information which refers to a conditional determining algorithm, wherein the conditional determining algorithm which is referred to by the branch information is used to determine a second index identifying a second connection rule for the plurality of functional units, and wherein the second index is processed after the first index, and determining the second index that is processed after the first index based on the results of the processed conditional determining algorithm; and (f) performing, via the activated functional unit, a predetermined process by using element information stored in the element information storing unit and outputting its result data, whereas the steps of (e) and (f) are repeated until the result data is moving picture data corresponding to the encoded video data.

9. The decoding method of claim 8, wherein if the element information, requested to the functional unit to be selected in the step of (e), is not stored in the element storing unit while the steps of (e) and (f) are repeated, the step of (b) is performed again, and then, the steps of (e) and (f) start to be repeated.

10. The decoding method of claim 8, wherein the description information comprise a syntax element table (SET) indicating a process for generating information related to a bit-stream syntax and element information corresponding to the bit-stream syntax; a syntax rule table (S-RT), indicating a connection between bit-stream syntaxes; a control signal and context information table (CSCIT), indicating detailed information related to the element information, an FU-rule table (F-RT), successively selecting the plurality of functional units; an FU list (FL), indicating a list of the functional units; an FU-CSCIT, indicating element information to be input into the selected functional unit, and a default value table (DVT) indicating the relation between an actual value and a code value when entropy coding.

11. The decoding method of claim 8, wherein if the bit-stream and the description information are input as one universal bit-stream, the step of (b) is performed prior to the step of dividing the bit-stream and the description information from the universal bit-stream.

12. An encoding method, comprising:
(a) converting input moving picture into a bit-stream according to a predetermined encoding method by successively using a plurality of functional units;
(b) generating syntax information of the bit-stream and description information according to the connection and processing order of the functional units; and
(c) providing the bit-stream and the description information to a decoding device, wherein the description information comprises a table including a first index identifying a first connection rule for the plurality of functional units, and an activated functional unit to be processed corresponding to the first index, wherein branch information which is processed refers to a conditional determining algorithm, wherein the conditional determining algorithm which is referred to by the branch information is used to determine a second index identifying a second connection rule for the plurality of functional units, wherein the second index is processed after the first index, and wherein the second index that is processed after the first index is determined based on the results of the processed conditional determining algorithm.

13. The encoding method of claim 12, wherein the step (c) comprises:
generating the bit-stream and the description information as one universal bit-stream; and
providing the universal bit-stream to the decoding device.

* * * * *